US012477297B2

(12) United States Patent
Vilkamo et al.

(10) Patent No.: US 12,477,297 B2
(45) Date of Patent: Nov. 18, 2025

(54) SOUND FIELD RELATED RENDERING

(71) Applicant: Nokia Technologies Oy, Espoo (FI)

(72) Inventors: Juha Vilkamo, Helsinki (FI); Koray Ozcan, Hampshire (GB); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 106 days.

(21) Appl. No.: 17/596,119

(22) PCT Filed: Jun. 3, 2020

(86) PCT No.: PCT/FI2020/050387
§ 371 (c)(1),
(2) Date: Dec. 3, 2021

(87) PCT Pub. No.: WO2020/249860
PCT Pub. Date: Dec. 17, 2020

(65) Prior Publication Data
US 2022/0303710 A1 Sep. 22, 2022

(30) Foreign Application Priority Data
Jun. 11, 2019 (GB) ..................................... 1908346

(51) Int. Cl.
*H04S 7/00* (2006.01)
*G10L 19/008* (2013.01)
*G10L 21/0364* (2013.01)

(52) U.S. Cl.
CPC ............ *H04S 7/304* (2013.01); *G10L 19/008* (2013.01); *G10L 21/0364* (2013.01);
(Continued)

(58) Field of Classification Search
CPC .. H04S 7/304; H04S 2400/11; H04S 2420/07; H04S 2420/11; G10L 19/008; G10L 21/0364; H04R 2203/12
See application file for complete search history.

(56) References Cited

U.S. PATENT DOCUMENTS 4,527,203 A 7/1985 Kamai
2016/0299738 A1 10/2016 Makinen et al. ................ 3/165
(Continued)

FOREIGN PATENT DOCUMENTS

CN 101843114 A 9/2010
CN 103325383 A 9/2013
(Continued)

OTHER PUBLICATIONS

3GPP TSG-SA4#102 Meeting, Jan. 28-Feb. 1, 2019, Bruges, Belgium, S4-190121, "Proposal for MASA Format" Nokia Corporation, 10 pages.
(Continued)

*Primary Examiner* — Jason R Kurr
(74) *Attorney, Agent, or Firm* — McCarter & English LLP

(57) ABSTRACT

An apparatus for spatial audio reproduction including circuitry configured to: obtain at least one focus parameter configured to define a focus shape; process a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and output the processed spatial audio signal, wherein the modified audio scene enables the relative emphasis in, at least in part, the portion of the spatial audio signal in the focus shape relative to at least in part other portions of the spatial audio signals outside the focus shape.

21 Claims, 23 Drawing Sheets

(52) U.S. Cl.
CPC ....... *H04R 2203/12* (2013.01); *H04S 2400/11* (2013.01); *H04S 2420/07* (2013.01); *H04S 2420/11* (2013.01)

(56) References Cited

U.S. PATENT DOCUMENTS

| | | | | |
|---|---|---|---|---|
| 2016/0379660 | A1* | 12/2016 | Wright | G10L 21/0364 381/57 |
| 2017/0180430 | A1 | 6/2017 | Ahmed Assem Aly Salama et al. | |
| 2017/0230760 | A1 | 8/2017 | Sanger et al. | |
| 2017/0347219 | A1 | 11/2017 | McCauley et al. | |
| 2019/0069083 | A1* | 2/2019 | Salehin | H04R 3/005 |
| 2019/0174246 | A1* | 6/2019 | De Bruijn | G06F 3/012 |
| 2019/0313200 | A1* | 10/2019 | Stein | G06F 3/011 |

FOREIGN PATENT DOCUMENTS

| | | | |
|---|---|---|---|
| CN | 105637894 | A | 6/2016 |
| EP | 2 613 564 | A2 | 7/2013 |
| GB | 2549532 | A | 10/2017 |
| JP | 2013514696 | A | 4/2013 |
| JP | 2013207759 | A | 10/2013 |
| JP | 2015198413 | A | 11/2015 |
| JP | 2018534853 | A | 11/2018 |
| WO | WO 2016/109065 | A1 | 7/2016 |

OTHER PUBLICATIONS

Laitinen, Mikko-Ville, "Binaural Reproduction for Directional Audio Coding" May 26, 2008, 74 pages.

* cited by examiner

401

403

601

603

701

703

SOUND FIELD RELATED RENDERING

CROSS REFERENCE TO RELATED APPLICATION

This patent application is a U.S. National Stage application of International Patent Application Number PCT/FI2020/050387 filed Jun. 3, 2020, which is hereby incorporated by reference in its entirety, and claims priority to GB 1908346.8 filed Jun. 11, 2019.

FIELD

The present application relates to apparatus and methods for sound-field related audio representation and rendering, but not exclusively for audio representation for an audio decoder.

BACKGROUND

Spatial audio playback to present media with multiple viewing directions is known. Examples of this playback include the viewing visual content of such a media include playback with: on head-mounted displays (or phones in head mounts) with (at least) head orientation tracking; or on phone screen without a head-mount where the view direction can be tracked by changing the position/orientation of the phone, or by any user interface gestures; or on surrounding screens.

A video associated with "media with multiple viewing directions" can be for example 360-degree video, 180-degree video, or other video substantially wider in viewing angle than traditional video. Traditional video refers to video content typically displayed as whole on a screen without an option (or any particular need) to change the viewing direction.

Audio associated with the video with multiple viewing directions can be presented on headphones, where the viewing direction is tracked and is affecting the spatial audio playback, or with surround loudspeaker setups.

Spatial audio that is associated with the video with multiple viewing directions can originate from spatial audio capture from microphone arrays (e.g., an array mounted on OZO-like VR camera, or a hand-held mobile device), or other sources such as studio mixes. The audio content can be also a mixture of several content types, such as microphone-captured sound and an added commentator track.

Spatial audio associated with the video with multiple viewing directions can be in various forms, for example: Ambisonic signal (of any order) consisting of spherical harmonic audio signal components. The spherical harmonics can be considered as a set of spatially selective beam signals. Ambisonics is utilized currently, e.g., in YouTube 360 VR video service. The advantage of Ambisonics is that it is a simple and well-defined signal representation; Surround loudspeaker signal, e.g., 5.1. Presently the spatial audio of typical movies is conveyed in this form. The advantage of a surround loudspeaker signal is the simplicity and legacy compatibility. Some audio formats similar to the surround loudspeaker signal format include audio objects, which can be considered as audio channels with a time-variant position. A position may inform both the direction and distance of the audio object, or the direction; Parametric spatial audio, such as two audio channels audio signal and associated spatial metadata in perceptually relevant frequency bands. Some state-of-the-art audio coding methods and spatial audio capture methods apply such a signal representation. The spatial metadata essentially determines how the audio signals should be spatially reproduced at the receiver end (e.g. to which directions at different frequencies). The advantage of parametric spatial audio is its versatility, quality, and ability to use low bit rates for encoding.

SUMMARY

There is provided according to a first aspect an apparatus comprising means configured to: obtain at least one focus parameter configured to define a focus shape; process a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and output the processed spatial audio signal, wherein the modified audio scene enables the relative emphasis in, at least in part, the portion of the spatial audio signal in the focus shape relative to at least in part other portions of the spatial audio signals outside the focus shape.

At least one focus parameter may be further configured to define a focus amount, and the means configured to process the spatial audio signal may be configured to process the spatial audio signal so as to control relative emphasis in, at least in part, a portion of the spatial audio signal in the focus shape relative to at least in part other portions of the spatial audio signals outside the focus shape further according to the focus amount.

The means configured to process the spatial audio signal may be configured to: increase relative emphasis in or decrease relative emphasis in, at least in part, the portion of the spatial audio signal in the focus shape relative to at least in part other portions of the spatial audio signals outside the focus shape.

The means configured to process the spatial audio signal may be configured to increase or decrease a relative sound level in, at least in part, the portion of the spatial audio signal in the focus shape relative to at least in part other portions of the spatial audio signals outside the focus shape.

The means configured to process the spatial audio signal may be configured to increase or decrease a relative sound level in, at least in part, the portion of the spatial audio signal in the focus shape relative to at least in part other portions of the spatial audio signals outside the focus shape according to the focus amount.

The means may be configured to obtain reproduction control information to control at least one aspect of outputting the processed spatial audio signal, and wherein the means configured to output the processed spatial audio signal may be configured to perform one of: process the processed spatial audio signal that represents the modified audio scene to generate an output spatial audio signal in accordance with the reproduction control information; process the spatial audio signal in accordance with the reproduction control information prior to the means configured to process the spatial audio signal that represents an audio scene to generate the processed spatial audio signal that represents a modified audio scene and output the processed spatial audio signal as the output spatial audio signal.

The spatial audio signal and the processed spatial audio signal may comprise respective Ambisonic signals and wherein the means configured to process the spatial audio signal to generate the processed spatial audio signal may be configured, for one or more frequency sub-bands, to: convert the Ambisonic signals associated with the spatial audio signal to a set of beam signals in a defined pattern; generate, a set of modified beam signals based on the set of beam signals, the focus shape and the focus amount; and convert the modified beam signals to generate the modified Ambisonic signals associated with the processed spatial audio signal.

The defined pattern may comprise a defined number of beams which are evenly spaced over a plane or over a volume.

The spatial audio signal and the processed spatial audio signal may comprise respective higher order Ambisonic signals.

The spatial audio signal and the processed spatial audio signal may comprise a subset of Ambisonic signal components of any order.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication, an energy ratio parameter, and potentially a distance indication for a plurality of frequency sub-bands, wherein the means configured to process the input spatial audio signal to generate the processed spatial audio signal may be configured to: compute, for one or more frequency sub-bands spectral adjustment factors based on the spatial metadata and the focus shape and focus amount; apply the spectral adjustment factors for the one or more frequency sub-bands of the one or more audio channels to generate one or more processed audio channels; compute respective modified energy ratio parameters associated with the one or more frequency sub-bands of the processed spatial audio signal based on the focus shape, focus amount and at least a part of the spatial metadata; and compose the processed spatial audio signal comprising the one or more processed audio channels, the modified energy ratio parameters, and the spatial metadata other than the energy ratio parameters.

The spatial audio signal and the processed spatial audio signal may comprise multi-channel loudspeaker channels and/or audio object channels, wherein the means configured to process the spatial audio signal into the processed spatial audio signal may be configured to: compute gain adjustment factors based on the respective audio channel direction indication, the focus shape and focus amount; apply the gain adjustment factors to the respective audio channels; and compose the processed spatial audio signal comprising the one or more processed multichannel loudspeaker audio channels and/or the one or more processed audio object channels.

The multi-channel loudspeaker channels and/or audio object channels may further comprise respective audio channel distance indication, and wherein the computing gain adjustment factors may be further based on the audio channel distance indication.

The means may be further configured to determine a default respective audio channel distance, and wherein the computing gain adjustment factors may be further based on the audio channel distance.

The at least one focus parameter configured to define a focus shape may comprise at least one of: a focus direction; a focus width; a focus height; a focus radius; a focus distance; a focus depth; a focus range; a focus diameter; and a focus shape characterizer.

The means may be further configured to obtain a focus input from a sensor arrangement that comprises at least one direction sensor and at least one user input, wherein the focus input may comprise: an indication of a focus direction for the focus shape based on the at least one direction sensor direction; and an indication of a focus width based on the at least one user input.

The focus input may further comprise an indication of the focus amount based on the at least one user input.

According to a second aspect there is provided a method comprising: obtaining at least one focus parameter configured to define a focus shape; processing a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and outputting the processed spatial audio signal, wherein the modified audio scene enables the relative emphasis in, at least in part, the portion of the spatial audio signal in the focus shape relative to at least in part other portions of the spatial audio signals outside the focus shape.

At least one focus parameter may be further configured to define a focus amount, and processing the spatial audio signal may comprise processing the spatial audio signal so as to control relative emphasis in, at least in part, a portion of the spatial audio signal in the focus shape relative to at least in part other portions of the spatial audio signals outside the focus shape further according to the focus amount.

Processing the spatial audio signal may comprise: increasing relative emphasis in or decrease relative emphasis in, at least in part, the portion of the spatial audio signal in the focus shape relative to at least in part other portions of the spatial audio signals outside the focus shape.

Processing the spatial audio signal may comprise increasing or decreasing a relative sound level in, at least in part, the portion of the spatial audio signal in the focus shape relative to at least in part other portions of the spatial audio signals outside the focus shape.

Processing the spatial audio signal may comprise increasing or decreasing a relative sound level in, at least in part, the portion of the spatial audio signal in the focus shape relative to at least in part other portions of the spatial audio signals outside the focus shape according to the focus amount.

The method may comprise obtaining reproduction control information to control at least one aspect of outputting the processed spatial audio signal, and wherein outputting the processed spatial audio signal may comprise performing one of: processing the processed spatial audio signal that represents the modified audio scene to generate an output spatial audio signal in accordance with the reproduction control information; processing the spatial audio signal in accordance with the reproduction control information prior to the means configured to process the spatial audio signal that represents an audio scene to generate the processed spatial audio signal that represents a modified audio scene and output the processed spatial audio signal as the output spatial audio signal.

The spatial audio signal and the processed spatial audio signal may comprise respective Ambisonic signals and wherein processing the spatial audio signal to generate the processed spatial audio signal may comprise, for one or more frequency sub-bands: converting the Ambisonic signals associated with the spatial audio signal to a set of beam signals in a defined pattern; generating, a set of modified beam signals based on the set of beam signals, the focus shape and the focus amount; and converting the modified beam signals to generate the modified Ambisonic signals associated with the processed spatial audio signal.

The defined pattern may comprise a defined number of beams which are evenly spaced over a plane or over a volume.

The spatial audio signal and the processed spatial audio signal may comprise respective higher order Ambisonic signals.

The spatial audio signal and the processed spatial audio signal may comprise a subset of Ambisonic signal components of any order.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication, an energy ratio parameter, and potentially a distance indication for a plurality of frequency sub-bands, wherein processing the input spatial audio signal to generate the processed spatial audio signal may comprise: computing, for one or more frequency sub-bands spectral adjustment factors based on the spatial metadata and the focus shape and focus amount; applying the spectral adjustment factors for the one or more frequency sub-bands of the one or more audio channels to generate one or more processed audio channels; computing respective modified energy ratio parameters associated with the one or more frequency sub-bands of the processed spatial audio signal based on the focus shape, focus amount and at least a part of the spatial metadata; and composing the processed spatial audio signal comprising the one or more processed audio channels, the modified energy ratio parameters, and the spatial metadata other than the energy ratio parameters.

The spatial audio signal and the processed spatial audio signal may comprise multi-channel loudspeaker channels and/or audio object channels, wherein processing the spatial audio signal into the processed spatial audio signal may comprise: computing gain adjustment factors based on the respective audio channel direction indication, the focus shape and focus amount; applying the gain adjustment factors to the respective audio channels; and composing the processed spatial audio signal comprising the one or more processed multichannel loudspeaker audio channels and/or the one or more processed audio object channels.

The multi-channel loudspeaker channels and/or audio object channels may further comprise respective audio channel distance indication, and wherein the computing gain adjustment factors may be further based on the audio channel distance indication.

The method may further comprise determining a default respective audio channel distance, and wherein the computing gain adjustment factors may be further based on the audio channel distance.

The at least one focus parameter configured to define a focus shape may comprise at least one of: a focus direction; a focus width; a focus height; a focus radius; a focus distance; a focus depth; a focus range; a focus diameter; and a focus shape characterizer.

The method may further comprise obtaining a focus input from a sensor arrangement that comprises at least one direction sensor and at least one user input, wherein the focus input may comprise: an indication of a focus direction for the focus shape based on the at least one direction sensor direction; and an indication of a focus width based on the at least one user input.

The focus input may further comprise an indication of the focus amount based on the at least one user input.

According to a third aspect there is provided an apparatus comprising at least one processor and at least one memory including a computer program code, the at least one memory and the computer program code configured to, with the at least one processor, cause the apparatus at least to: obtain at least one focus parameter configured to define a focus shape; process a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and output the processed spatial audio signal, wherein the modified audio scene enables the relative emphasis in, at least in part, the portion of the spatial audio signal in the focus shape relative to at least in part other portions of the spatial audio signals outside the focus shape.

At least one focus parameter may be further configured to define a focus amount, and the apparatus caused to process the spatial audio signal may be caused to process the spatial audio signal so as to control relative emphasis in, at least in part, a portion of the spatial audio signal in the focus shape relative to at least in part other portions of the spatial audio signals outside the focus shape further according to the focus amount.

The apparatus caused to process the spatial audio signal may be caused to: increase relative emphasis in or decrease relative emphasis in, at least in part, the portion of the spatial audio signal in the focus shape relative to at least in part other portions of the spatial audio signals outside the focus shape.

The apparatus caused to process the spatial audio signal may be caused to increase or decrease a relative sound level in, at least in part, the portion of the spatial audio signal in the focus shape relative to at least in part other portions of the spatial audio signals outside the focus shape.

The apparatus caused to process the spatial audio signal may be caused to increase or decrease a relative sound level in, at least in part, the portion of the spatial audio signal in the focus shape relative to at least in part other portions of the spatial audio signals outside the focus shape according to the focus amount.

The apparatus may be caused to obtain reproduction control information to control at least one aspect of outputting the processed spatial audio signal, and wherein the apparatus caused to output the processed spatial audio signal may be caused to perform one of: process the processed spatial audio signal that represents the modified audio scene to generate an output spatial audio signal in accordance with the reproduction control information; process the spatial audio signal in accordance with the reproduction control information prior to the means configured to process the spatial audio signal that represents an audio scene to generate the processed spatial audio signal that represents a modified audio scene and output the processed spatial audio signal as the output spatial audio signal.

The spatial audio signal and the processed spatial audio signal may comprise respective Ambisonic signals and wherein the apparatus caused to process the spatial audio signal to generate the processed spatial audio signal may be caused, for one or more frequency sub-bands, to: convert the Ambisonic signals associated with the spatial audio signal to a set of beam signals in a defined pattern; generate, a set of modified beam signals based on the set of beam signals, the focus shape and the focus amount; and convert the modified beam signals to generate the modified Ambisonic signals associated with the processed spatial audio signal.

The defined pattern may comprise a defined number of beams which are evenly spaced over a plane or over a volume.

The spatial audio signal and the processed spatial audio signal may comprise respective higher order Ambisonic signals.

The spatial audio signal and the processed spatial audio signal may comprise a subset of Ambisonic signal components of any order.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication, an energy ratio parameter, and potentially a distance indication for a plurality of frequency sub-bands, wherein the apparatus caused to process the input spatial audio signal to generate the processed spatial audio signal may be caused to: compute, for one or more frequency sub-bands spectral adjustment factors based on the spatial metadata and the focus shape and focus amount; apply the spectral adjustment factors for the one or more frequency sub-bands of the one or more audio channels to generate one or more processed audio channels; compute respective modified energy ratio parameters associated with the one or more frequency sub-bands of the processed spatial audio signal based on the focus shape, focus amount and at least a part of the spatial metadata; and compose the processed spatial audio signal comprising the one or more processed audio channels, the modified energy ratio parameters, and the spatial metadata other than the energy ratio parameters.

The spatial audio signal and the processed spatial audio signal may comprise multi-channel loudspeaker channels and/or audio object channels, wherein the apparatus caused to process the spatial audio signal into the processed spatial audio signal may be caused to: compute gain adjustment factors based on the respective audio channel direction indication, the focus shape and focus amount; apply the gain adjustment factors to the respective audio channels; and compose the processed spatial audio signal comprising the one or more processed multichannel loudspeaker audio channels and/or the one or more processed audio object channels.

The multi-channel loudspeaker channels and/or audio object channels may further comprise respective audio channel distance indication, and wherein the computing gain adjustment factors may be further based on the audio channel distance indication.

The apparatus may be further caused to determine a default respective audio channel distance, and wherein the computing gain adjustment factors may be further based on the audio channel distance.

The at least one focus parameter configured to define a focus shape may comprise at least one of: a focus direction; a focus width; a focus height; a focus radius; a focus distance; a focus depth; a focus range; a focus diameter; and a focus shape characterizer.

The apparatus may be further caused to obtain a focus input from a sensor arrangement that comprises at least one direction sensor and at least one user input, wherein the focus input may comprise: an indication of a focus direction for the focus shape based on the at least one direction sensor direction; and an indication of a focus width based on the at least one user input.

The focus input may further comprise an indication of the focus amount based on the at least one user input.

According to a fourth aspect there is provided an apparatus comprising focus parameter obtaining circuitry configured to obtain at least one focus parameter configured to define a focus shape; spatial audio signal processing circuitry configured to process a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and output control circuitry configured to output the processed spatial audio signal, wherein the modified audio scene enables the relative emphasis in, at least in part, the portion of the spatial audio signal in the focus shape relative to at least in part other portions of the spatial audio signals outside the focus shape.

According to a fifth aspect there is provided a computer program comprising instructions [or a computer readable medium comprising program instructions] for causing an apparatus to perform at least the following: obtain at least one focus parameter configured to define a focus shape; process a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and output the processed spatial audio signal, wherein the modified audio scene enables the relative emphasis in, at least in part, the portion of the spatial audio signal in the focus shape relative to at least in part other portions of the spatial audio signals outside the focus shape.

According to a sixth aspect there is provided a non-transitory computer readable medium comprising program instructions for causing an apparatus to perform at least the following: obtain at least one focus parameter configured to define a focus shape; process a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and output the processed spatial audio signal, wherein the modified audio scene enables the relative emphasis in, at least in part, the portion of the spatial audio signal in the focus shape relative to at least in part other portions of the spatial audio signals outside the focus shape.

According to a seventh aspect there is provided an apparatus comprising: means for obtaining at least one focus parameter configured to define a focus shape; means for processing a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and means for outputting the processed spatial audio signal, wherein the modified audio scene enables the relative emphasis in, at least in part, the portion of the spatial audio signal in the focus shape relative to at least in part other portions of the spatial audio signals outside the focus shape.

According to an eighth aspect there is provided a computer readable medium comprising program instructions for causing an apparatus to perform at least the following: obtaining at least one focus parameter configured to define a focus shape; processing a spatial audio signal that represents an audio scene to generate a processed spatial audio signal that represents a modified audio scene, so as to control relative emphasis in, at least in part, a portion of the spatial audio signal in the focus shape relative to at least in part other portions of the spatial audio signals outside the focus shape; and outputting the processed spatial audio signal, wherein the modified audio scene enables the relative emphasis in, at least in part, the portion of the spatial audio signal in the focus shape relative to at least in part other portions of the spatial audio signals outside the focus shape.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of efficient rendering and playback of spatial audio signals.

Previous spatial audio signal playback example allows the user to control the focus direction and the focus amount. However, in some situations, such control of the focus direction/amount may not be sufficient. In some situations, it may be desirable to enable the user with a control interface to control the shape of the focus. In a sound field, there may be a number of different features such as multiple dominant sound sources in certain viewing directions as well as ambient sounds. Some users may prefer to hear certain features of the sound field whereas some others may prefer to hear alternative features of the sound field depending on which viewing direction is desirable. It is understood that such playback audio is dependent on one or more preferences and can be configurable based on user related preferences. The desired performance from the playback apparatus is to configure playback of the spatial sound so that the focus to various shapes or areas (e.g., narrow, wide, shallow, deep, near, far) can be controlled.

Figure 1A:
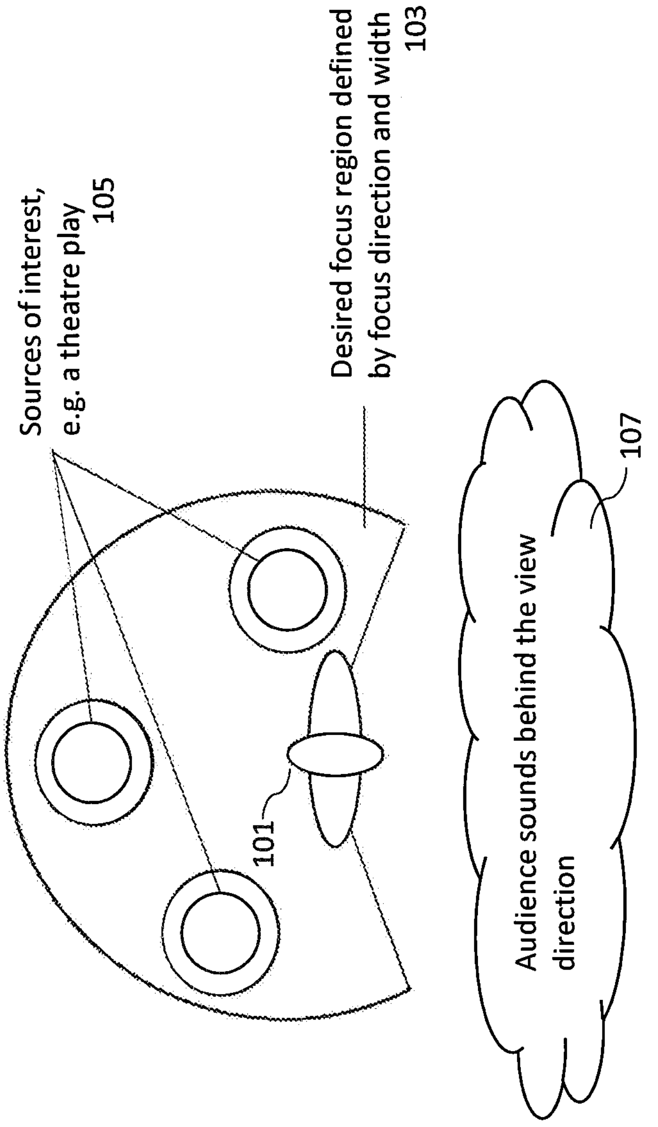
FIGS. 1*a* and 1*b* show example sound scenes showing audio focus regions or areas.

As an example, there may be audio content of interest within a sector (or a cone or another spatial span or range) rather than simply in one direction. Specifically it may be useful to control the spatial span of the focus. The FIGS. 1*a* and 1*b* described in the following illustrate what a user is intended to perceive in listening to a reproduced spatial audio signal. For example, there could be sources of interest on one side of the user, and distracting sources on the other side of the user, as exemplified in FIG. 1*a*. FIG. 1*a* shows a user 101 who is located with a defined orientation. Within the audio scene there are sources of interest 105, for example talkers within a theatre play which are within a desired focus region 103 which is defined by a focus direction and width. Furthermore there may be audience or other ambient audio content 107 which are outside the view direction, such as behind the view direction.

Moreover, the user may wish to change the width of the sector over time. For example at first focus to all sources in the theatre play by keeping the focus sector relatively wide (as shown in FIG. 1*a*), and then later on focus to a particular source by narrowing the focus sector.

Figure 1B:
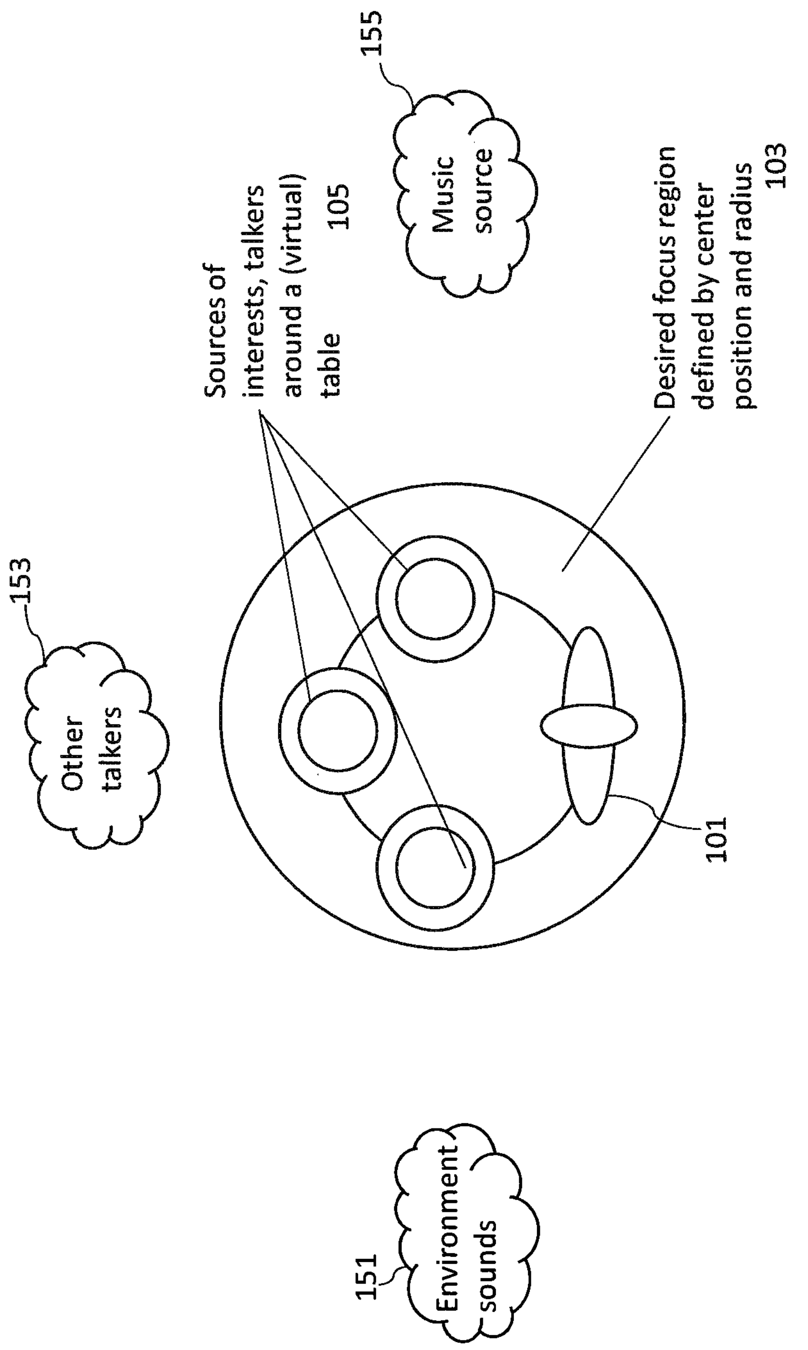

As another example, the desired or interesting audio content may be at a certain distance (with respect to the listener or with respect to another position). For example there may be an undesired or uninteresting audio source at a certain distance in a certain direction and a desired or an interesting audio source at another distance in the same direction (or nearly the same direction). This is shown in FIG. 1*b*. FIG. 1*b* for example shows the user 101 located with a defined orientation within the audio scene with the sources of interest 105, for example talkers around a table which are within the desired focus region 103 defined by a center position and radius. Furthermore there may be other ambient audio content such as environmental audio content 151 to the left, a music source audio component 155 and other talkers audio content 153 beyond the sources of interest which are outside the desired focus region. In such embodiments the audio focus region or shape is determined by the center focus position and the focus radius.

Hence, the embodiments as discussed herein attempt to provide control of the focus shape (in addition to the focus direction and amount). The concept as discussed with respect to the embodiments described herein relates to spatial audio reproduction in media playback with multiple viewing directions by providing control of the audio focus shape where the audio scene over the controlled audio focus shape changes but the signal format can remain the same.

The embodiments provide at least one focus shape parameter corresponding to a selectable direction by adjusting any (or a combination of two or all) of the following parameters corresponding to the selected direction: focus width; focus height; focus radius; focus distance; and focus depth. This parameter set in some embodiments comprises parameters which define any arbitrary shape. The spatial audio signal processing can in some embodiments be performed by: obtaining spatial audio signals associated with the media with multiple viewing directions; obtaining the focus direction and amount parameters; obtaining at least one focus shape parameter; modifying the spatial audio signals to have the desired focus characteristics; and reproducing the modified spatial audio signals (with headphones or loudspeakers).

The obtained spatial audio signals may, for example, be: Ambisonic signals; loudspeaker signals; parametric spatial audio formats such as a set of audio channels and the associated spatial metadata.

The focus shape may in some embodiments depend on which parameters are available. For example, in the case of having only direction, width, and height, the shape may be an ellipsoid cone-type volume. As another example, in the case of having only distance and depth, the focus shape may be a hollow sphere. In the case of not having width/height and/or depth, they may be considered to have some default value. Moreover, in some embodiments, an arbitrary focus shape may be used.

The focus amount may in some embodiments determine the 'degree' or how much to focus. For example the focus may be from 0% to 100%, where 0% means keeping the original sound scene unmodified, and 100% means focusing maximally on the desired spatial shape.

In some embodiments different users may want to have different focus characteristics and the original spatial audio signals may be individually modified and reproduced for each user, based on their individual preferences.

Figure 2A:
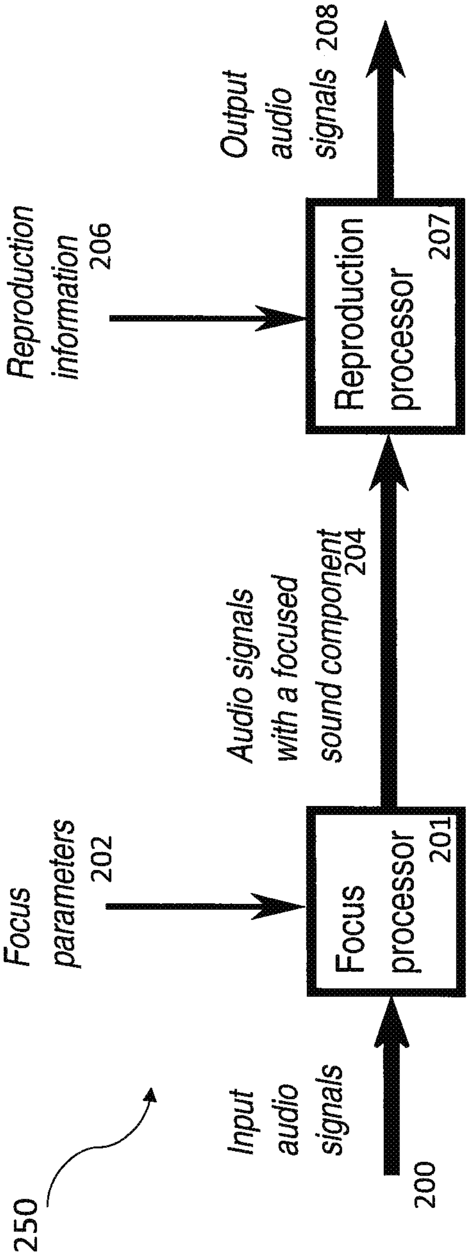
FIGS. 2*a* and 2*b* shows schematically an example playback apparatus and method for operating a playback apparatus according to some embodiments.

FIG. 2*a* illustrates a block diagram of some components and/or entities of a spatial audio processing arrangement 250 according to an example. It would be understood that the two separate steps (focus processor+reproduction processor) shown in this figure and further detailed later can be implemented as an integrated process, or in some examples in the opposite order as described herein (where the reproduction processor operations are then followed by the focus processor operations). The spatial audio processing arrangement 250 comprises an audio focus processor 201 configured to receive an input audio signal and furthermore focus parameters 202 and derive an audio signal with a focused sound component 204 based on the input audio signal 200 and in dependence of the focus parameters 202 (which may include a focus direction; focus amount; focus height; focus radius; focus distance; and focus depth). In some embodiments the apparatus can be configured to obtain a focus shape where the focus shape comprises at least one focus parameter (which may be configured to define the focus shape). The spatial audio processing arrangement 250 may furthermore comprise an audio reproduction processor 207 configured to receive the audio signals with a focused sound component 204 and reproduction control information 206 and be configured to derive an output audio signal 208 in a predefined audio format based on the audio signal with a focused sound component 204 in further dependence of reproduction control information 206 that serves to control at least one aspect pertaining to processing of the spatial audio signal with a focused component in the audio reproduction processor 207. The reproduction control information 206 may comprise an indication of a reproduction orientation (or a reproduction direction) and/or an indication of an applicable loudspeaker configuration. In consideration of the method for processing a spatial audio signal described above, the audio focus processor 201 may be arranged to implement the aspect of processing the spatial audio signal by modifying the audio scene so as to control emphasis at least in a portion of the spatial audio signal in the received focus region according to the received focus amount. The audio reproduction processor 207 may output the processed spatial audio signal based on the observed direction and/or location as a modified audio scene, wherein the modified audio scene demonstrates emphasis at least for said portion of the spatial audio signal in the focus region and according to the received focus amount.

In the illustration of FIG. 2*a*, each of the input audio signal, the audio signal with a focused sound component and the output audio signal is provided as a respective spatial audio signal in a predefined spatial audio format. Hence, these signals may be referred to as an input spatial audio signal, a spatial audio signal with a focused sound component and an output spatial audio signal, respectively. Along the lines described in the foregoing, typically a spatial audio signal conveys an audio scene that involves both one or more directional sound sources at respective specific positions of the audio scene as well as the ambience of the audio scene. In some scenarios, though, a spatial audio scene may involve one or more directional sound sources without the ambience or the ambience without any directional sound sources. In this regard, a spatial audio signal comprises information that conveys one or more directional sound components that represent distinct sound sources that have certain position within the audio scene (e.g. a certain direction of arrival and a certain relative intensity with respect to a listening point) and/or an ambient sound component that represents environmental sounds within the audio scene. It should be noted that the division of the audio scene into directional sound component(s) and ambient component is typically a representation or approximation only, whereas an actual sound scene may involve more complex features such as wide sources and coherent acoustic reflections. Nevertheless, even with such complex acoustic features, the conceptualization of an audio scene as a combination of direct and ambient components is typically a fair representation or approximation at least in a perceptual sense.

Typically, the input audio signal and the audio signal with a focused sound component are provided in the same predefined spatial format, whereas the output audio signal may be provided in the same spatial format as applied for the input audio signal (and the audio signal with a focused sound component) or a different predefined spatial format may be employed for the output audio signal. The spatial audio format of the output audio signal is selected in view of the characteristics of the sound reproduction hardware applied for playback for the output audio signal. In general, the input audio signal may be provided in a first predetermined spatial audio format and the output audio signal may be provided in a second predetermined spatial audio format. Non-limiting examples of spatial audio formats suitable for use as the first and/or second spatial audio format include Ambisonics, surround loudspeaker signals according to a predefined loudspeaker configuration, a predefined parametric spatial audio format. More detailed non-limiting examples of usage of these spatial audio formats in the framework of the spatial audio processing arrangement 250 as the first and/or second spatial audio format are provided later in this disclosure.

The spatial audio processing arrangement 250 is typically applied to process the input spatial audio signal 200 as a sequence of input frames into a respective sequence of output frames, each input (output) frame including a respective segment of digital audio signal for each channel of the input (output) spatial audio signal, provided as a respective time series of input (output) samples at a predefined sampling frequency. In some embodiments the input signal to the spatial audio processing arrangement 250 can be an encoded form, for example AAC, or AAC+ embedded metadata. In such embodiments the encoded audio input can be initially decoded. Similarly in some embodiments, the output from the spatial audio processing arrangement 250 could be encoded in any suitable manner.

In typical example, the spatial audio processing arrangement 250 employs a fixed predefined frame length such that each frame comprises respective L samples for each channel of the input spatial audio signal, which at the predefined sampling frequency maps to a corresponding duration in time. As an example in this regard, the fixed frame length may be 20 milliseconds (ms), which at a sampling frequency of 8, 16, 32 or 48 kHz results in a frame of L=160, L=320, L=640 and L=960 samples per channel, respectively. The frames may be non-overlapping or they may be partially overlapping, depending on if the processors apply filter banks and how these filter banks are configured. These values, however, serve as non-limiting examples and frame lengths and/or sampling frequencies different from these examples may be employed instead, depending e.g. on the desired audio bandwidth, on desired framing delay and/or on available processing capacity.

In the spatial audio processing arrangement 250, the focus refers to a user-selectable spatial region of interest. The focus may be, for example, a certain direction, distance, radius, arc of the audio scene in general. In another example, the focus region in which a (directional) sound source of interest is currently positioned. In the former scenario, the user-selectable focus typically denotes a region that stays constant or changes infrequently since the focus is predominantly in a specific spatial region, whereas in the latter scenario the user-selected focus may change more frequently since the focus is set to a certain sound source that may (or may not) change its position/shape/size in the audio scene over time. In an example, the focus may be defined, for example, as an azimuth angle that defines the spatial direction of interest with respect to a first predefined reference direction and/or as an elevation angle that defines the spatial direction of interest with respect to a second predefined reference direction and/or a shape and/or distance and/or radius or shape parameter.

Figure 2B:
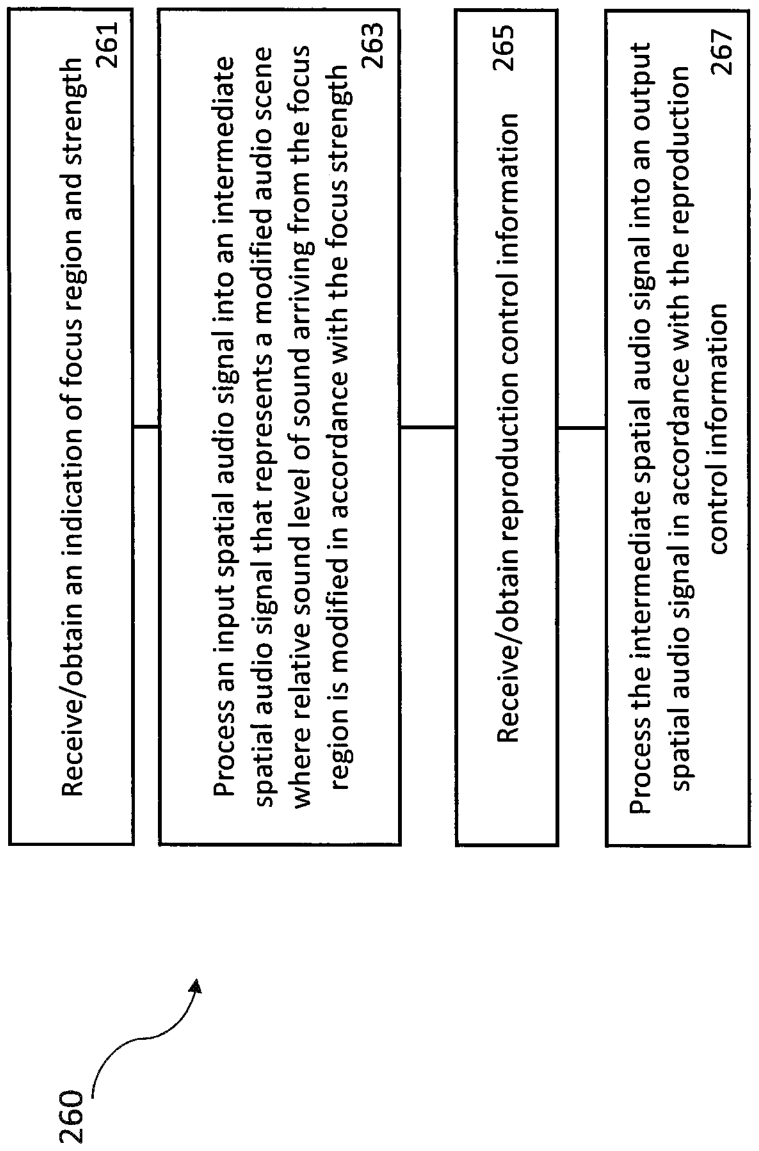

The functionality described in the foregoing with references to components of the spatial audio processing arrangement 250 may be provided, for example, in accordance with a method 260 illustrated by a flowchart depicted in FIG. 2*b*. The method 260 may be provided e.g. by an apparatus arranged to implement the spatial audio processing system 250 described in the present disclosure via a number of examples. The method 260 serves as a method for processing an input spatial audio signal that represents an audio scene into an output spatial audio signal that represents a modified audio scene. The method 260 comprises receiving an indication of a focus region and an indication of a focus strength, as indicated in block 261. The method 260 further comprises processing the input spatial audio signal into an intermediate spatial audio signal that represents the modified audio scene where relative level of sound arriving from said focus region is modified according to said focus strength, as indicated in block 263. The method 260 further comprises receiving reproduction control information that controls processing of the intermediate spatial signal into the output spatial audio signal, as indicated in block 265. The reproduction control information may define, for example, at least one of a reproduction orientation (e.g. a listening direction or a viewing direction) or a loudspeaker configuration for the output spatial audio signal. The method 260 further comprises processing the intermediate spatial audio signal into the output spatial audio signal in accordance with said reproduction control information, as indicated in block 267.

The method 260 may be varied in a plurality of ways, for example in accordance with examples pertaining to respective functionality of components of the spatial audio processing arrangement 250 provided in the foregoing and in the following.

In some embodiments the input to the spatial audio processing arrangement 250 is Ambisonic signals. The apparatus can be configured to receive (and the method can be applied to) Ambisonic signals of any order. However, as the first-order Ambisonic (FOA) signal is in terms of the spatial selectivity fairly broad (first-degree directivity in specific), having fine control on focus shape is better exemplified with higher-order Ambisonics (HOA) that have higher spatial selectivity. In particular in the following examples the method and apparatus is configured to receive $3^{rd}$ order Ambisonic audio signals.

Figure 3:
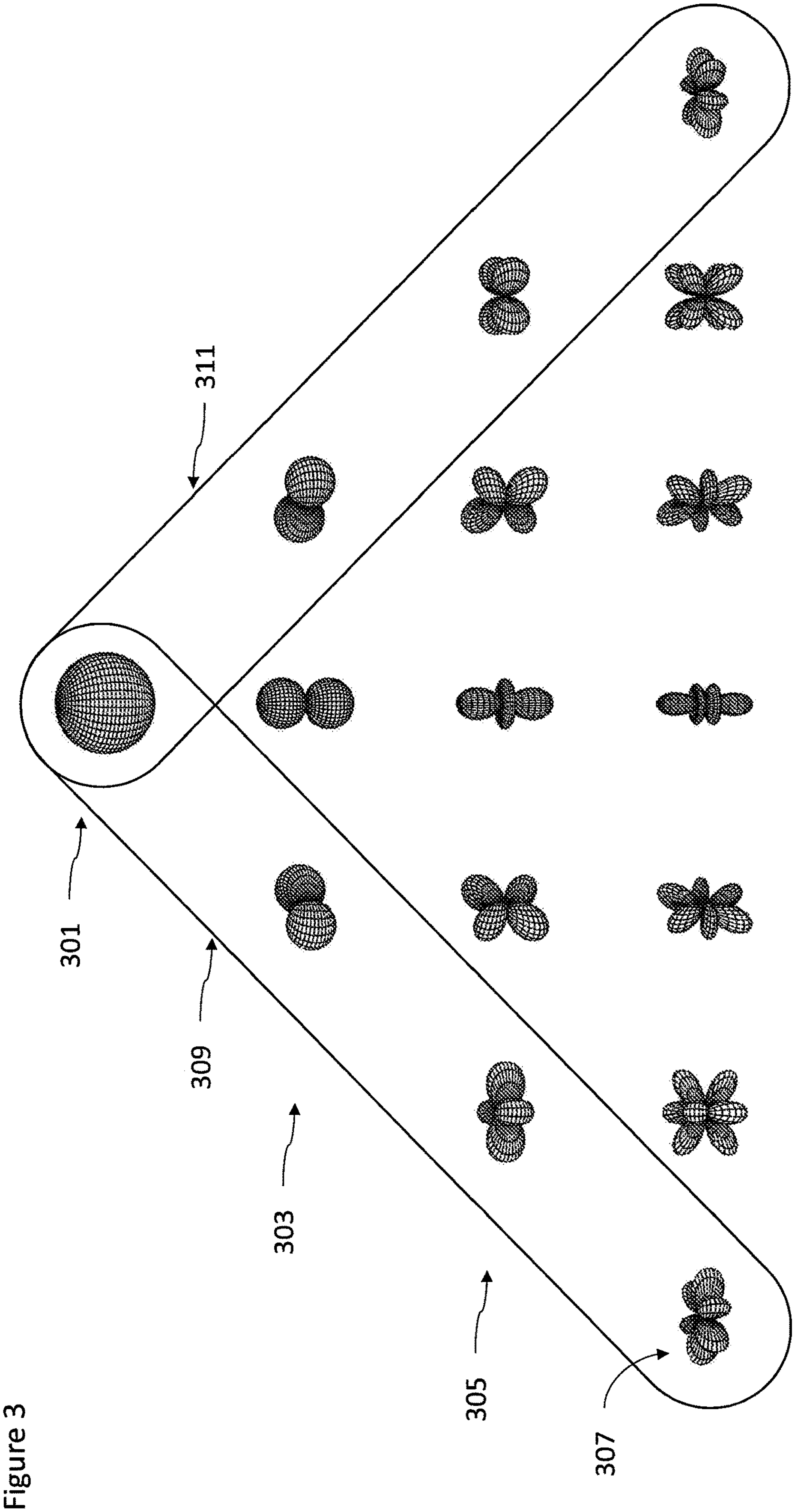
FIG. 3 shows a schematic view of spherical harmonic patterns and selected subsets of these spherical harmonic patterns applied in some embodiments.

$3^{rd}$ order Ambisonic audio signals have 16 beam pattern signals in total (in 3D). However for simplicity the following example consider here only those 7 Ambisonic components (in other word the audio signals) that are more "horizontal", as shown in FIG. 3 in order to show the implementation of focus shape parameters. For example FIG. 3 shows $0^{th}$ order spherical harmonic pattern 301, $1^{st}$ order spherical harmonic patterns 303, $2^{nd}$ order spherical harmonic patterns 305 and $3^{rd}$ order spherical harmonic patterns 307. Furthermore FIG. 3 shows the subsets 309 and 311 related up to the $3^{rd}$ order spherical harmonic patterns which are more "horizontal".

Figure 5A:
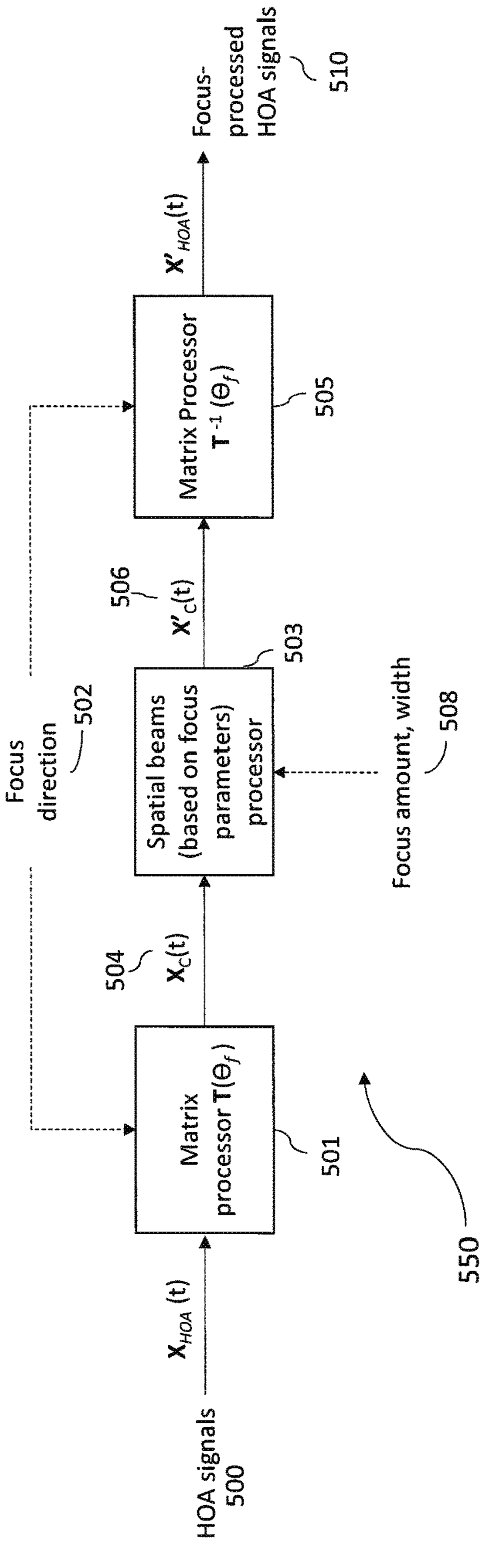
FIGS. 5*a* and 5*b* show schematically an example focus processor as shown in FIG. 2*a* with a higher order Ambisonic audio signal input and method of operating the example focus processor according to some embodiments.

With respect to FIG. 5*a* is shown a focus processor 550 configured to receive the example Ambisonic signals $x_{HOA}(t)$ 500 and the focus direction 502. The input to the focus processor 550 in this example as described above is a subset $3^{rd}$ order Ambisonic signal, for example the subsets 309 and 311. The $3^{rd}$ order Ambisonic signal $x_{HOA}(t)$ 500 is also described in the following as HOA for simplicity. A signal x(t), where t is the discrete sample index, arriving from horizontal azimuth θ can be represented as a HOA signal by:

$$x_{HOA}(t) = a(\theta)x(t) = \begin{bmatrix} 1 \\ \sin(\theta) \\ \cos(\theta) \\ \sin(2\theta) \\ \cos(2\theta) \\ \sin(3\theta) \\ \cos(3\theta) \end{bmatrix} x(t),$$

where a(θ) is the vector of Ambisonic weights for azimuth θ. As seen in this equation, the selected subset of the Ambisonic patterns can be defined with these very simple mathematical expressions in the horizontal plane.

In some embodiments the focus processor 550 comprises a matrix processor 501. The matrix processor 501 is configured in some embodiments to convert the Ambisonic (HOA) signals 500 (corresponding to Ambisonic or spherical harmonic patterns) to a set of beam signals (corresponding to beam patterns) in 7 evenly spaced horizontal directions. This in some embodiments may be represented by a transformation matrix $T(\theta_f)$, where $\theta_f$ is the focus direction 502 parameter:

$$x_c(t) = T(\theta_f)x_{HOA}(t),$$

where $$T(\theta_f) = \begin{bmatrix} a^T(\theta_f) \\ a^T(\theta_f + p) \\ a^T(\theta_f - p) \\ a^T(\theta_f + 2p) \\ a^T(\theta_f - 2p) \\ a^T(\theta_f + 3p) \\ a^T(\theta_f - 3p) \end{bmatrix},$$

where $$p = \frac{2\pi}{7}.$$

Note that the transformation includes the focus direction $\theta_f$ 502 parameter based processing such that the first pattern is aligned to the focus direction and the other patterns are aligned to other directions symmetrically spaced.

Figure 4:
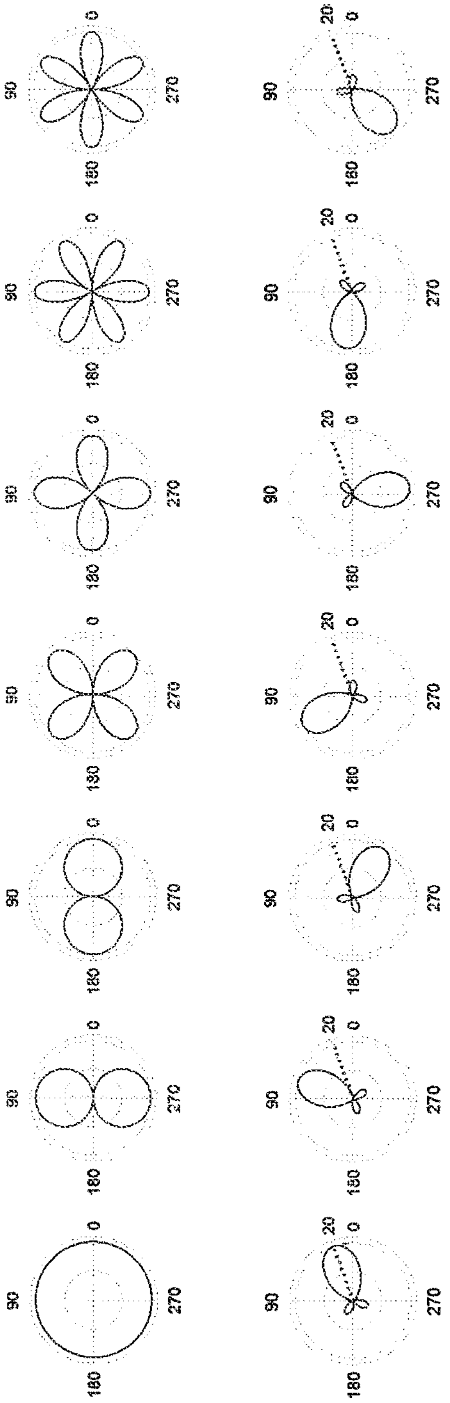
FIG. 4 shows schematically beam patterns corresponding to Ambisonic signals and transformed beam signals aligned to an example focus direction of 20 degrees.

For example, when $\theta_f$=20 degrees, the beam patterns corresponding to the transformed signals $x_c(t)$ 504 and the beam patterns corresponding to the original HOA signals are shown in FIG. 4. FIG. 4 for example shows a top row 401 which shows example beam patterns corresponding to Ambisonic signals and the bottom row 403 which shows the transformed beam signals where the focus direction which is at 20 degrees. The transformed audio signals may then be output to the spatial beams (based on focus parameters) processor 503.

The focus processor 550 may further comprise a spatial beams (based on focus parameters) processor 503. The spatial beams processor 503 is configured to receive the transformed Ambisonic signals $x_c(t)$ 504 from the matrix processor 501 and furthermore receive the focus amount and width focus parameters 508.

The spatial beams processor 503 is configured to then to modify the spatial beam signals $x_c(t)$ 504 to generate processed or modified spatial beam signals $x'_c(t)$ 506 based on the focus amount and shape parameters 508. The processed or modified spatial beam signals $x'_c(t)$ 506 can then be output to a further matrix processor 505. The spatial beams processor 503 is configured to implement various processing methods based on the types of focus shape parameters. In this example embodiment the focus parameters are focus direction, focus width, and focus amount. The focus amount can be determined as a value a ranging between 0 . . . 1 where 1 denotes the maximum focus. The focus width $\theta_w$(determined as the angle from the focus direction to the edge of the focus arc) is also a variable or controllable parameter. The spatial beam signals can be generated by $$x'_c(t) = I(\theta_w, a)x_c(t),$$

where $I(\theta_w, a)$ is a diagonal matrix with its diagonal elements determined as $i(\theta_w, a)$, where $$i(\theta_w) = \begin{bmatrix} \max[0, \min(1, \theta_w + p)] \\ \max[0, \min(1, \theta_w)] \\ \max[0, \min(1, \theta_w)] \\ \max[0, \min(1, \theta_w - p)] \\ \max[0, \min(1, \theta_w - p)] \\ \max[0, \min(1, \theta_w - 2p)] \\ \max[0, \min(1, \theta_w - 2p)] \end{bmatrix} a + (1 - a).$$

It should be noticed that the beams $x_c(t)$ are in this example formulated in such a manner that the first beam points towards the focus direction, the second beam towards the focus direction+p, and so on. As the result, when applying the matrix $I(\theta_w, a)$, the beams farther away from the focus direction will be attenuated depending on the focus width parameter.

The focus processor 201 comprises a further matrix processor 505. The further matrix processor 505 is configured to receive the processed or modified spatial beam signals $x'_c(t)$ 506 and the focus direction 502 and inverse transform the result to generate the focus-processed HOA signals. The transformation matrix $T(\theta_f)$ is invertible, and therefore the inversion processing can be expressed as $$x'_{HOA}(t) = T^{-1}(\theta_f)x'_c(t),$$

where $x'_{HOA}(t)$ is the focus processed HOA output 510.

Figure 6:
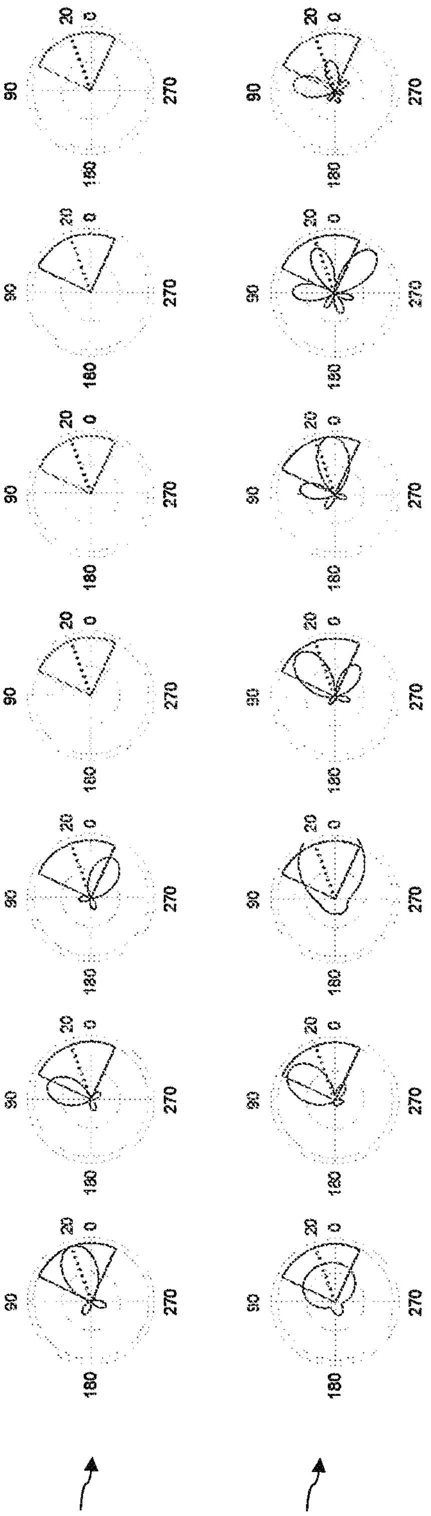
FIG. 6 shows schematically a visualisation of the processing of an example focus direction of 20 degrees and width of 45 degrees.
Figure 7:
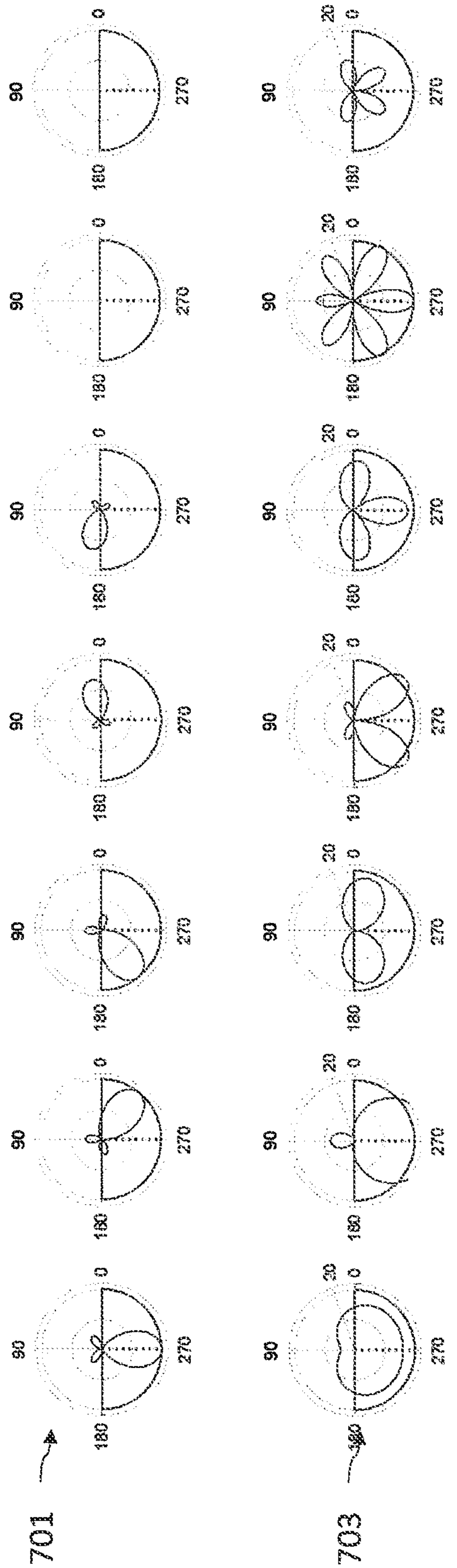
FIG. 7 shows schematically a visualisation of the processing of a further example focus direction of minus 90 degrees and width of 90 degrees.

With respect to FIG. 6 is shown an example where the focus parameters have a maximum focus amount a=1, and the focus direction is $\theta_f$=20 degrees and with a focus width $\theta_w$=45 degrees. The top row 601 shows the beam patterns corresponding to the focus processed transform domain signals $x'_c(t)$ and the focus effect region and the bottom row 603 shows the beam patterns corresponding to the output signal $x'_{HOA}(t)$. With respect to FIG. 7 is shown an example where the focus parameters have a maximum focus amount a=1, and the focus direction parameters are $\theta_f$=−90 degrees and $\theta_w$=90 degrees. The top row 701 shows the beam patterns corresponding to the focus processed transform domain signals $x'_c(t)$ and the bottom row 703 shows the beam patterns corresponding to the output signal $x'_{HOA}(t)$.

In the above examples, HOA processing is considered only in a set of more "horizontal" beam pattern signals was shown. It would be understood that these operations can be extended to 3D, using a set of beam patterns in 3D.

Figure 5B:
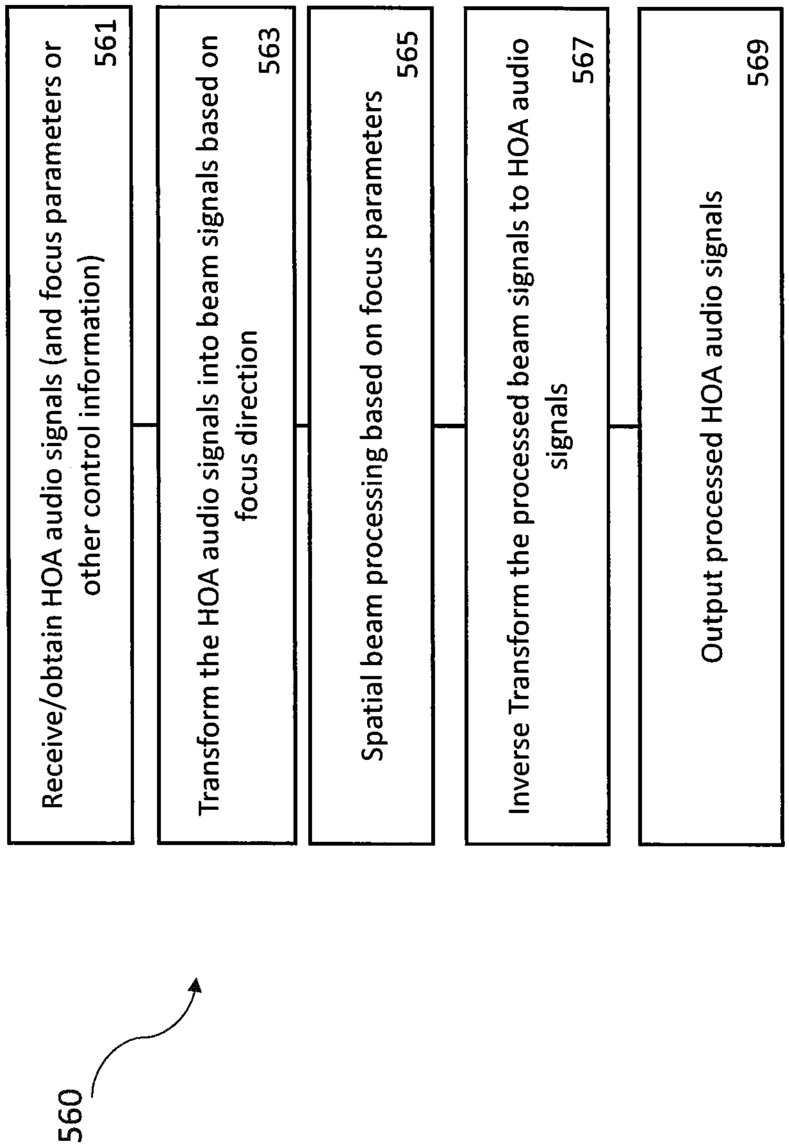

With respect to FIG. 5*b* is shown a flow diagram of the operation 560 of the HOA focus processor as shown in FIG. 5*a*.

The initial operation is receiving the HOA audio signals (and the focus parameters such as direction, width, amount or other control information) as shown in FIG. 5*b* by step 561.

The next operation is the generating of the transformed HOA audio signals into beam signals as shown in FIG. 5*b* by step 563.

Having transformed the HOA audio signals into beam signals then the next operation is one of spatial beams processing as shown in FIG. 5*b* by step 565.

Then the processed beam audio signals are then inverse transformed back into a HOA format as shown in FIG. 5*b* by step 567.

The processed HOA audio signals are then output as shown in FIG. 5*b* by step 569.

Figure 8A:
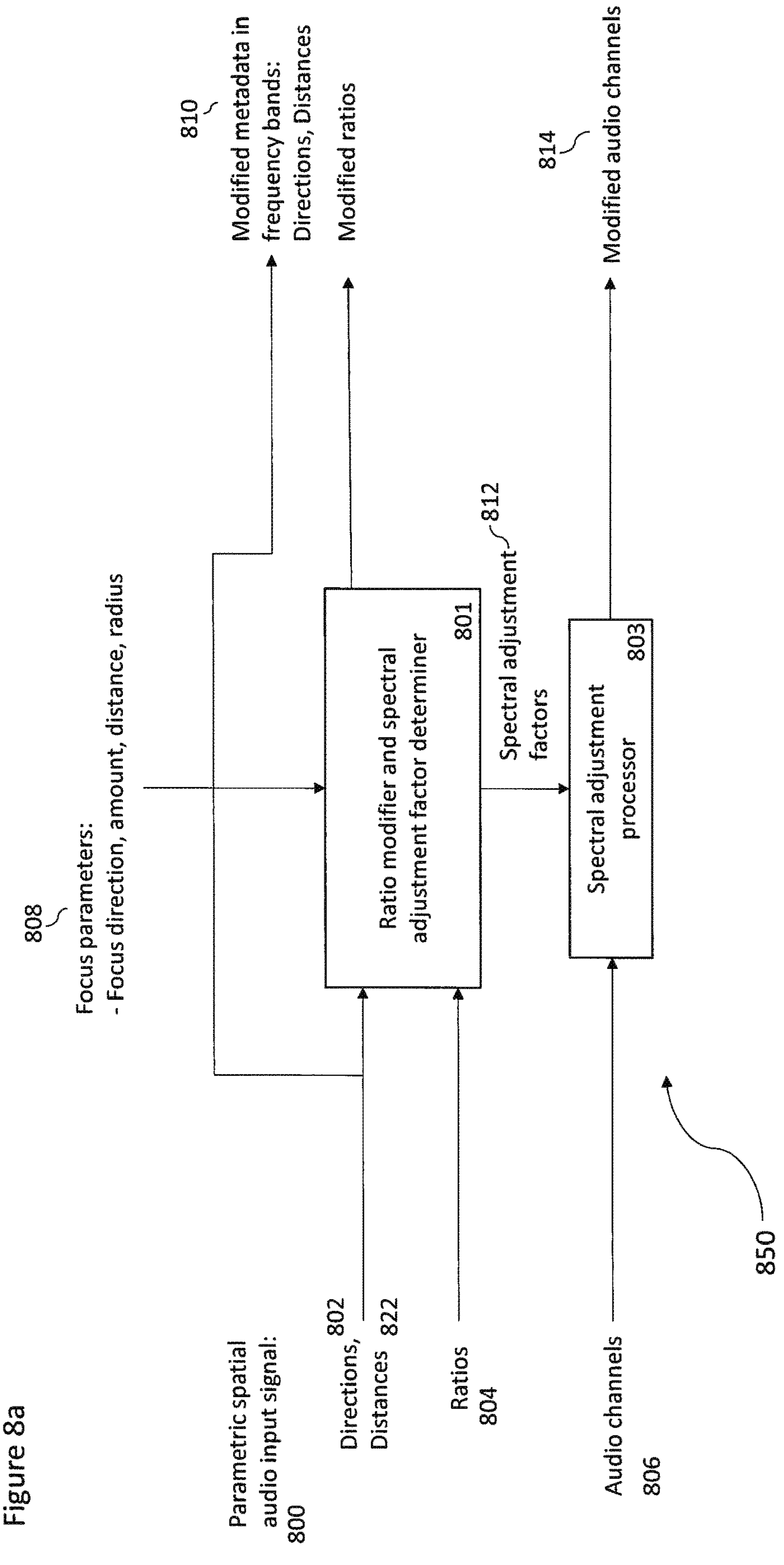
FIGS. 8*a* and 8*b* show schematically an example focus processor as shown in FIG. 2*a* with a parametric spatial audio signal input and method of operating the example focus processor according to some embodiments.

With respect to FIG. 8*a* is shown a focus processor which is configured to receive a parametric spatial audio signal as an input. The parametric spatial audio signals comprise audio signals and spatial metadata such as direction(s) and direct-to-total energy ratio(s) in frequency bands. The structure and generation of parametric spatial audio signals are known and their generation have been described from microphone arrays (e.g., mobile phones, VR cameras). A parametric spatial audio signal can furthermore be generated from loudspeaker signals and Ambisonic signals as well. The parametric spatial audio signal in some embodiments may be generated from an IVAS (Immersive Voice and Audio Services) audio stream, which can be decoded and demultiplexed to the form of spatial metadata and audio channels. A typical number of audio channels in such a parametric spatial audio stream is two audio channels audio signals, however in some embodiments the number of audio channels can be any number of audio channels.

In these examples the parametric information comprises depth/distance information, which may be implemented in 6-degrees of freedom (6DOF) reproduction. In 6DOF, the distance metadata is used (along with the other metadata) to determine how the sound energy and direction should change as a function of user movement.

Therefore in this example each spatial metadata direction parameter is associated both with a direct-to-total energy ratio and a distance parameter. The estimation of distance parameters in context of parametric spatial audio capture has been detailed in earlier applications such as GB patent applications GB1710093.4 and GB1710085.0 and is not explored further for clarity reasons.

The focus processor 850 configured to receive parametric (in this case 6DOF-enabled) spatial audio 800 is configured to use the focus parameters (which in these examples are focus direction, amount, distance, and radius) to determine how much the direct and ambient components of the parametric spatial audio signal should be attenuated or emphasized to enable the focus effect.

In the following example the method (and the formulas) are expressed without any variations over time it should be understood that all the parameters may vary over the time.

In some embodiments the focus processor comprises a ratio modifier and spectral adjustment factor determiner 801 which is configured to receive the focus parameters 808 and additionally the spatial metadata consisting of directions 802, distances 822, direct-to-total energy ratios 804 in frequency bands.

The ratio modifier and spectral adjustment factor determiner is configured to implement the focus shape as a sphere in 3D space. First, the focus direction and distance are converted to a Cartesian coordinate system (3×1 y-z-x vector f) by $$f = \begin{bmatrix} \sin(\text{focus\_azi})\cos(\text{focus\_ele}) \\ \sin(\text{focus\_ele}) \\ \cos(\text{focus\_azi})\cos(\text{focus\_ele}) \end{bmatrix} * \text{focus\_distance}.$$

Similarly, at each frequency band k, the spatial metadata directions and distances are converted into the Cartesian coordinate system (3×1 y-z-x vector m(k)) by $$m(k) = \begin{bmatrix} \sin(azi(k))\cos(ele(k)) \\ \sin(ele(k)) \\ \cos(azi(k))\cos(ele(k)) \end{bmatrix} * \text{distance}(k).$$

The units of the spatial metadata distance and focus distance parameters should be the same (e.g., both in meters, or in any other scale). A mutual distance value d(k) between f and m(k) may be formulated simply as:

$$d(k)=|f-m(k)|,$$

which here means the length of the vector (f−m(k)).

The mutual distance value d(k) is then utilized in a gain-function along with the focus amount parameter a that is between 0 . . . 1 and the focus radius parameter $d_r$ (in same units as d(k)). When we perform focus, an example gain formula is $$f(k) = \begin{cases} c*a+(1-a), & \text{when } d(k) \le d_r \\ 1-a, & \text{otherwise} \end{cases},$$

where c is a gain constant for the focus, for example a value of 4.

In practice, it may be desirable to smooth the above functions such that the focus gain function smoothly transitions from a high value at the focus area to a low value at the non-focused area.

Then a new direct portion value D(k) of the parametric spatial audio signal can be formulated as $$D(k)=r(k)*f(k)$$

where r(k) is the direct-to-total energy ratio value at band k. A new ambient portion value A(k) can be formulated as $$A(k)=(1-r(k))*(1-a).$$

The spectral correction factors (k) that is output 812 to a spectral adjustment processor 803 is then formulated based on the overall modification of the sound energy, in other words, $$s(k)=\sqrt{D(k)+A(k)}.$$

A new modified direct-to-total energy ratio parameter r'(k) is then formulated to replace r(k) in the spatial metadata $$r'(k) = \frac{D(k)}{D(k)+A(k)}.$$

At the numerically undetermined case D(k)=A(k)=0, then r'(k) can also be set to zero.

The direction and distance parameters of the spatial metadata may in some embodiments be not modified by the metadata adjustment and spectral adjustment factor determiner 801 and the modified and unmodified metadata output 810.

The spatial processor 850 may comprise a spectral adjustment processor 803. The spectral adjustment processor 803 may be configured to receive the audio signals 806 and the spectral adjustment factors 812. The audio signals can in some embodiments be in a time-frequency representation, or alternatively they are first transformed to the time-frequency domain for the spectral adjustment processing. The output 814 also can be in the time-frequency domain, or inverse transformed to the time domain before the output. The domain of the input and output depends on the implementation.

The spectral adjustment processor 803 may be configured to multiply, for each band k, the frequency bins (of the time frequency transform) of all channels within the band k by the spectral adjustment factor s(k). In other words performing the spectral adjustment. The multiplication (i.e., spectral correction) may be smoothed over time to avoid processing artefacts.

In other words, the processor is configured to modify the spectrum of the signal and the spatial metadata such that the procedure results in a parametric spatial audio signal that has been modified according to the focus parameters (in this case: focus direction, amount, distance, radius).

Figure 8B:
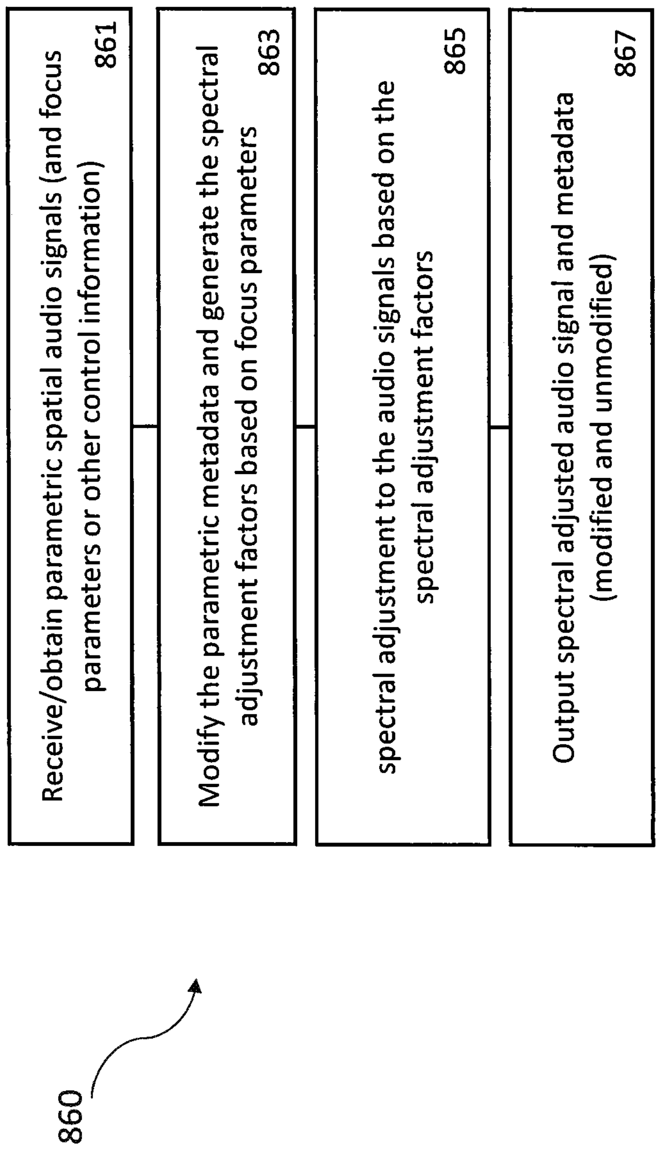

With respect to FIG. 8*b* is shown a flow diagram 860 of the operation of the parametric spatial audio input processor as shown in FIG. 8*a*.

The initial operation is receiving the parametric spatial audio signals (and focus parameters or other control information) as shown in FIG. 8*b* by step 861.

The next operation is the modifying of the parametric metadata and generating the spectral adjustment factors as shown in FIG. 8*b* by step 863.

The next operation is making a spectral adjustment to the audio signals as shown in FIG. 8*b* by step 865.

Then the spectral adjusted audio signal and modified (and unmodified) metadata can then be output as shown in FIG. 8*b* by step 867.

Figure 9A:
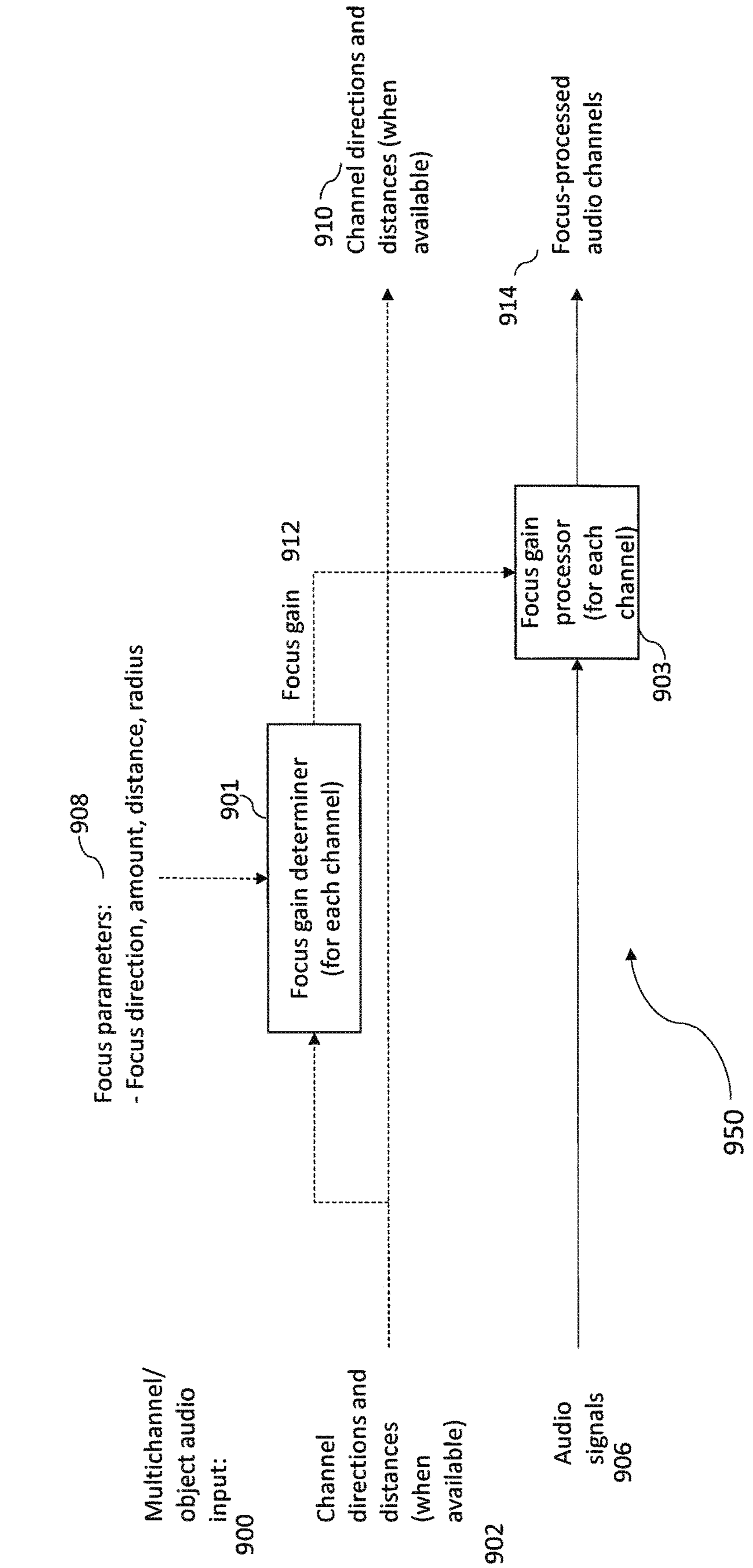
FIGS. 9*a* and 9*b* show schematically an example focus processor as shown in FIG. 2*a* with a multichannel and/or audio object audio signal input and method of operating the example focus processor according to some embodiments.

With respect to FIG. 9*a* is shown a focus processor 950 which is configured to receive a multichannel or object audio signal as an input 900. The focus processor in such examples may comprise a focus gain determiner 901. The focus gain determiner 901 is configured to receive the focus parameters 908 and the channel/object positional/directional information, which may be static or time-variant. The focus gain determiner 901 is configured to generate a direct gain f(k) parameter which is output as focus gain 912 for each channel based on the focus parameters 908 and the channel/object positional/directional information 902 from the input signal 900. In some embodiments the channel signal directions are signalled, and in some embodiments they are assumed. For example, when there are 6 channels, the directions may be assumed to be 5.1 audio channel directions. In some embodiments there may be a lookup table which is used to determine channel directions as a function of the number of channels.

For audio objects which have a direction and a distance (i.e., a position), the focus gain determiner 901 can utilize the same implementation processing as expressed in context of the parametric audio processing to determine the direct-gain f(k) 912 based on the spatial metadata and the focus parameters. In these embodiments there is no filter bank. In other words, there is only one frequency band k.

The focus processor furthermore may comprise a focus gain processor (for each channel) 903. The focus gain processor 903 is configured to receive the focus gains f(k) 912 for each audio channel and the audio signals 906. The focus gains 912 can then be applied to the corresponding audio channel signals 906 (and in some embodiments furthermore be temporal smoothed). The output from the focus gain processor 903 may be a focus-processed audio channel audio signal 914.

In these examples the channel directional/positional information 902 is unaltered and also provided as a channel directional/positional information output 910.

In some embodiments when the input audio channels do not have distance information (e.g., the input is loudspeaker or object sound with only directions but not distance) one option to handle such audio channels is to determine a fixed default distance for such signals and apply the same formula to determine f(k).

Figure 10:
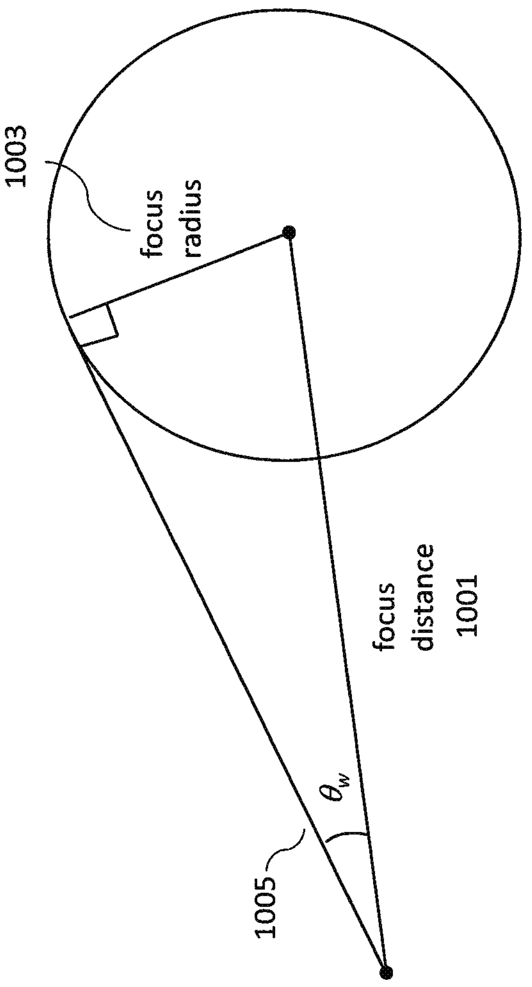
FIG. 10 shows an example focus width determination based on a focus distance and radius input according to some embodiments.

In some embodiments determining the focus gain f(k) 912 for such audio channels may be based on the angular difference between the focus direction and the direction of the audio channel. In some embodiments this may first determine a focus width $\theta_w$. For example as shown in FIG. 10 a focus width $\theta_w$ 1005 may be determined based on trigonometry using a focus distance 1001 and focus radius 1103 wherein the focus width is generated by the angle formed by the right angled triangle with a hypotenuse formed by the focus distance 1001 and the opposite side formed by the focus radius 1003. The focus width can be determined simply by $$\theta_w = a\sin\left(\frac{\text{focus\_radius}}{\text{focus\_distance}}\right).$$

Then the angle $\theta_a$ is determined between the focus direction and the direction of the audio channel (for each audio channel individually). Then similar formula as discussed above can be used to determine f(k), where $d_r$ is replaced by $\theta_w$ and d(k) replaced by $\theta_a$ (when determining the focus gain for the audio channels without the distance information). In some embodiments when the focus radius is larger than focus distance, the asin function above is not defined, and a large value (e.g., $\pi$) can be used for the focus width $\theta_w$.

Figure 9B:
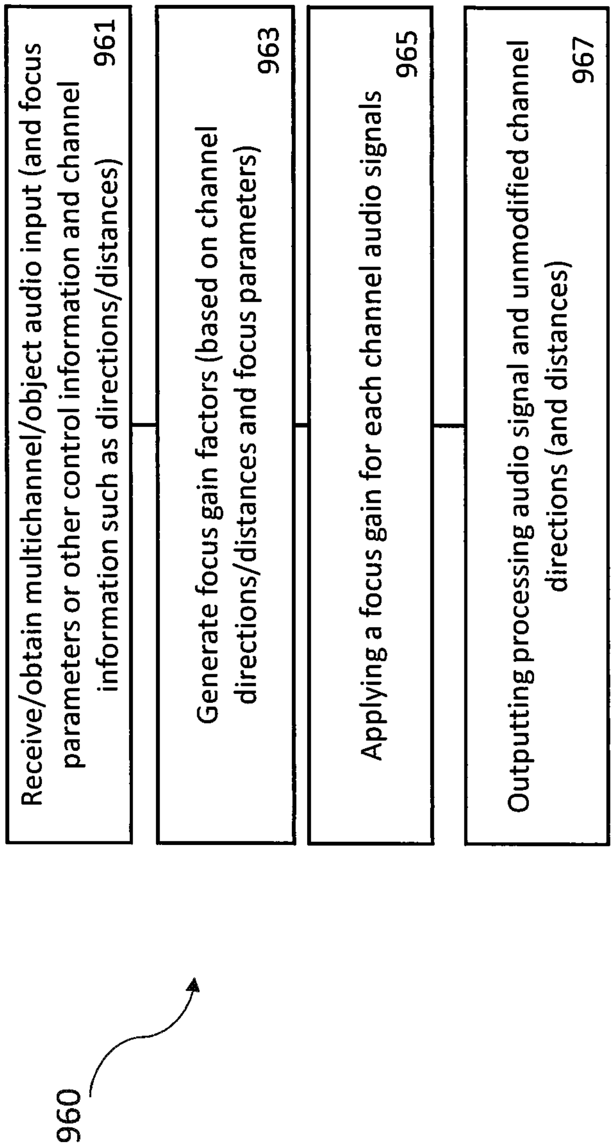

With respect to FIG. 9*b* is shown a flow diagram 960 of the operation of the multichannel/object audio input processor as shown in FIG. 9*a*.

The initial operation is receiving the multichannel/object audio signals (and focus parameters or other control information and channel information such as directions/distances) as shown in FIG. 9*b* by step 961.

The next operation generating the focus gain factors as shown in FIG. 9*b* by step 963.

The next operation is applying a focus gain for each channel audio signals as shown in FIG. 9*b* by step 965.

Then the processing audio signal and unmodified channel directions (and distances) can then be output as shown in FIG. 9*b* by step 967.

In some embodiments the focus shape can be defined also using other parameters and other combinations of the parameters. In these cases, the focus processor can be modified from the above examples to use these parameters.

Figure 11A:
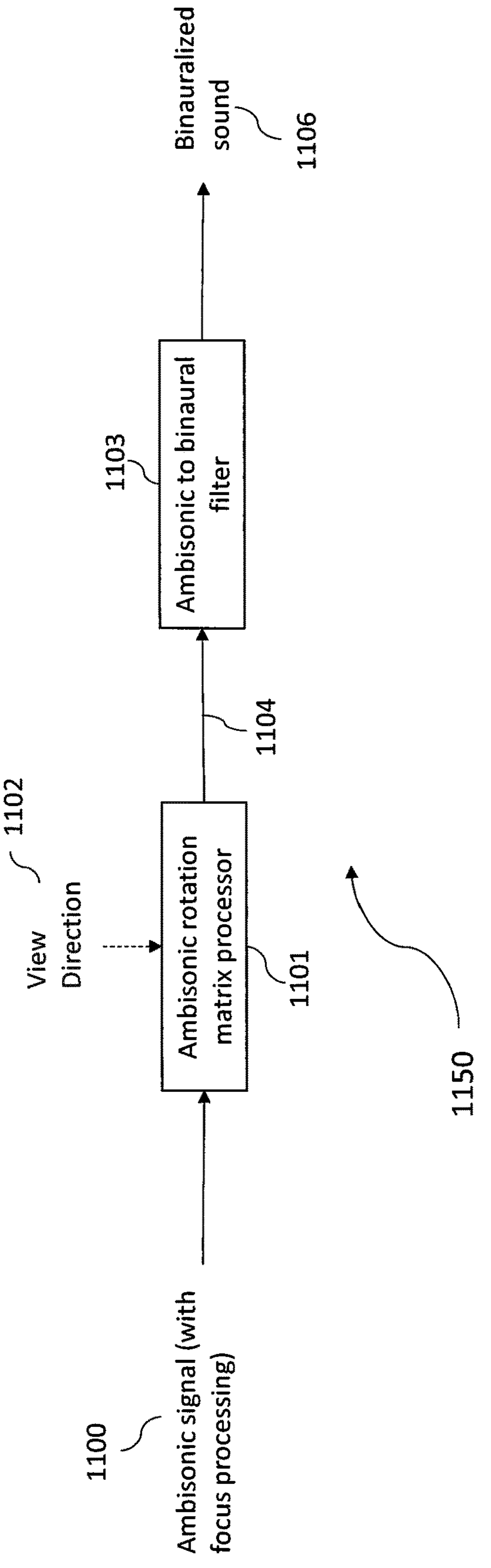
FIGS. 11*a* and 11*b* show schematically an example reproduction processor as shown in FIG. 2*a* with a higher order Ambisonic audio signal input and method of operating the example reproduction processor according to some embodiments.

With respect to FIG. 11*a* is shown an example of the reproduction processor 1150 based on the Ambisonic audio input (for example which may be configured to receive the output from the example focus processor as shown in FIG. 5*a*).

In these examples reproduction processor may comprise an Ambisonic rotation matrix processor 1101. The Ambisonic rotation matric processor 1101 is configured to receive the Ambisonic signal with focus processing 1100 and the view direction 1102. The Ambisonic rotation matrix processor 1101 is configured to generate a rotation matrix based on the view direction parameter 1102. This may in some embodiments use any suitable method, such as those applied in head-tracked Ambisonic binauralization (or more generally, such rotation of spherical harmonics is used in many fields, including other than audio). The rotation matrix then be applied to the Ambisonic audio signals. The result of which are rotated Ambisonic signals with added focus 1104, which are output to an Ambisonic to binaural filter 1103.

The Ambisonic to binaural filter 1103 is configured to receive the rotated Ambisonic signals with added focus 1104. The Ambisonic to binaural filter 1103 may comprise a pre-formulated 2×K matrix of finite impulse response (FIR) filters that are applied to the KAmbisonic signals to generate the 2 binaural signals 1106. The FIR filters may have been generated by least-squares optimization methods with respect to a set of head-related impulse responses (HRIRs). An example of such a design procedure is to transform the HRIR data set to frequency bins (for example by FFT) to obtain the HRTF data set, and to determine for each frequency bin a complex-valued processing matrix that in a least-squares sense approximates the available HRTF data set at the data points of the HRTF data set. When for all frequency bins the complex valued matrices are determined in such a way, the result can be inverse transformed (for example by inverse FFT) as time-domain FIR filters. The FIR filters may also be windowed, for example by using a Hann window.

There are many known methods which may be used to render an Ambisonic signal to loudspeaker output. One example may be a linear decoding of the Ambisonic signals to a target loudspeaker configuration. This may be applied when the order of the Ambisonic signals is sufficiently high, for example, at least $3^{rd}$ order, but preferably $4^{th}$ order. In a specific example of such linear decoding an Ambisonic decoding matrix may be designed that, when applied to the Ambisonic signals (corresponding to Ambisonic beam patterns), generates loudspeaker signals corresponding to beam patterns that in a least-square sense approximate the vector-base amplitude panning (VBAP) beam patterns suitable for the target loudspeaker configuration. Processing the Ambisonic signals with such a designed Ambisonic decoding matrix may be configured to generate the loudspeaker sound output. In such embodiments the reproduction processor is configured to receive information regarding the loudspeaker configuration.

Figure 11B:
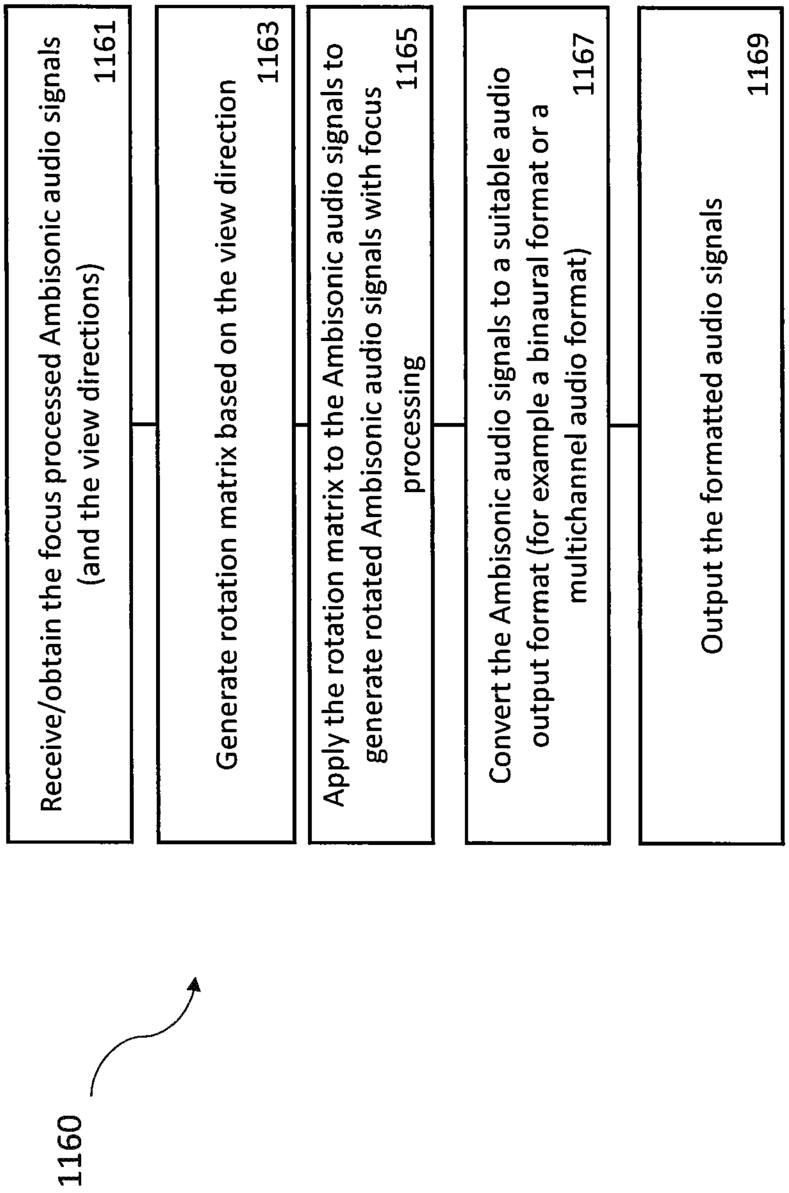

With respect to FIG. 11*b* is shown a flow diagram 1160 of the operation of the Ambisonic input reproduction processor as shown in FIG. 11*a*.

The initial operation is receiving the focus processed Ambisonic audio signals (and the view directions) as shown in FIG. 11*b* by step 1161.

The next operation is one of generating rotation matrix based on the view direction as shown in FIG. 11*b* by step 1163.

The next operation is applying the rotation matrix to the Ambisonic audio signals to generate rotated Ambisonic audio signals with focus processing as shown in FIG. 11*b* by step 1165.

Then the next operation is converting the Ambisonic audio signals to a suitable audio output format, for example a binaural format (or a multichannel audio format) as shown in FIG. 11*b* by step 1167.

Then the output audio format is then output as shown in FIG. 11*b* by step 1169.

Figure 12A:
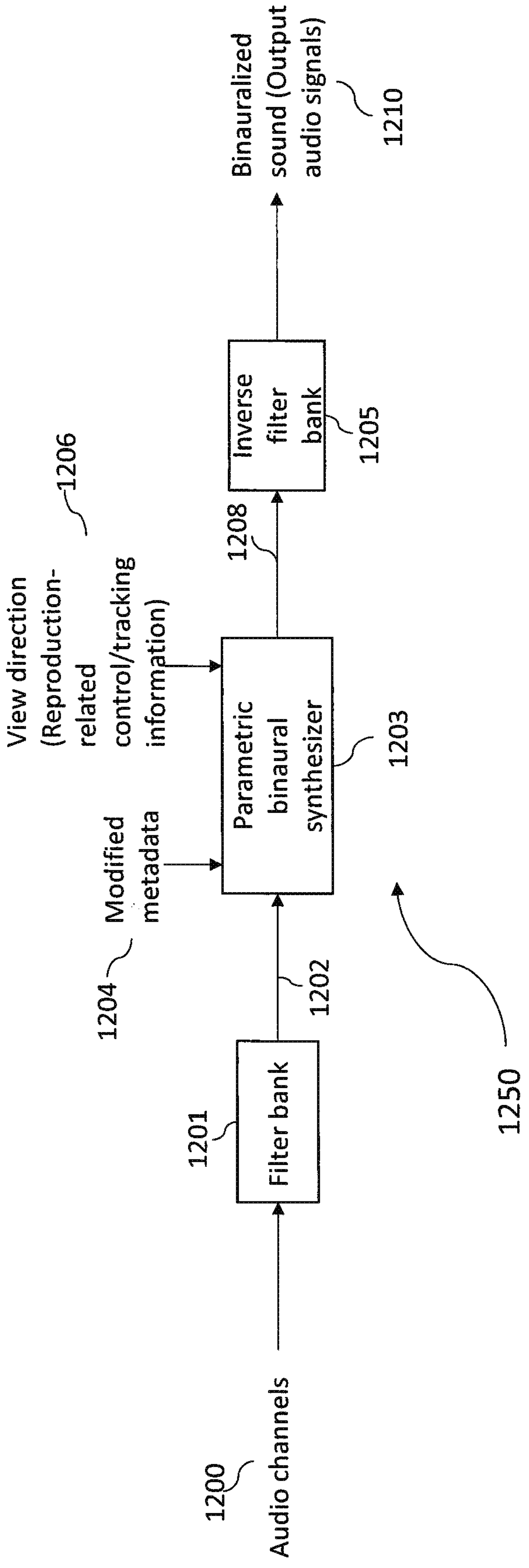
FIGS. 12*a* and 12*b* show schematically an example reproduction processor as shown in FIG. 2*a* with a parametric spatial audio signal input and method of operating the example reproduction processor according to some embodiments.

With respect to FIG. 12*a* is shown an example of the reproduction processor 1250 based on the parametric spatial audio input (for example which may be configured to receive the output from the example focus processor as shown in FIG. 8*a*).

In some embodiments the reproduction processor comprises a filter bank 1201 configured to receive the audio channels 1200 audio signals and transform the audio channels to frequency bands (unless the input is already in a suitable time-frequency domain). Examples of suitable filter banks include the short-time Fourier transform (STFT) and the complex quadrature mirror filter (QMF) bank. The time-frequency audio signals 1202 can be output to a parametric binaural synthesizer 1203.

In some embodiments the reproduction processor comprises a parametric binaural synthesizer 1203 configured to receive the time-frequency audio signals 1202 and the modified (and unmodified) metadata 1204 and also the view direction 1206 (or suitable reproduction related control or tracking information). In context of 6DOF reproduction, the user position may be provided along with the view direction parameter.

The parametric binaural synthesizer 1203 may be configured to implement any suitable known parametric spatial synthesis method configured to generate a binaural audio signal (in frequency bands) 1208, since the focus modification has taken place already for the signals and the metadata before the parametric binauralization block. The binauralized time-frequency audio signals 1208 can then be passed to an inverse filter bank 1205. The embodiments may further feature the reproduction processor comprising an inverse filter bank 1205 configured to receive the binauralized time-frequency audio signals 1208 and generate an inverse to the applied forward filter bank thus generate a time domain binauralized audio signal 1210 with the focus characteristics suitable for reproduction by headphones (not shown in FIG. 12*a*).

In some embodiments the binaural audio signal output is replaced by a loudspeaker channel audio signals output format from the parametric spatial audio signals using suitable loudspeaker synthesis methods. Any suitable approach may be used, for example one where the view direction parameter is replaced with information of the positions of the loudspeakers, and the binaural processor is replaced with a loudspeaker processor, based on suitable known methods.

Figure 12B:
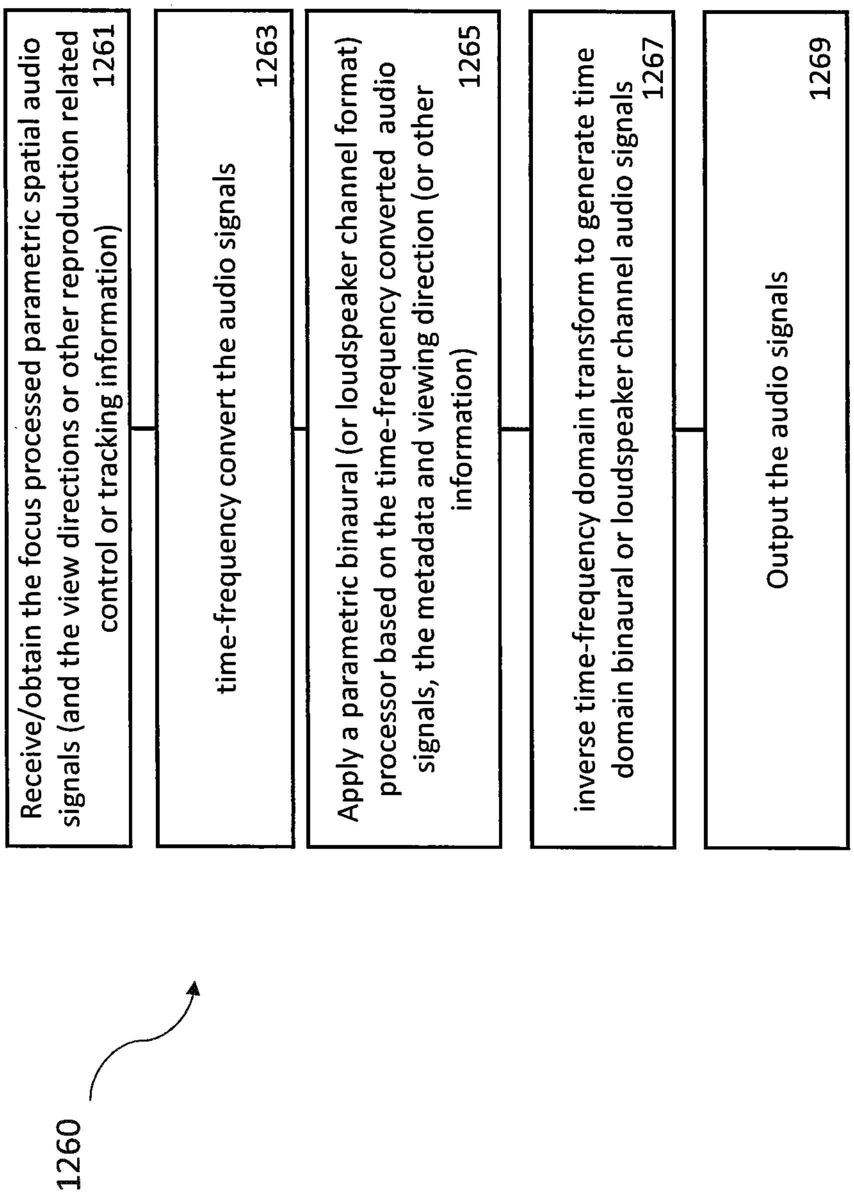

With respect to FIG. 12*b* is shown a flow diagram 1260 of the operation of the parametric spatial audio input reproduction processor as shown in FIG. 12*a*.

The initial operation is receiving the focus processed parametric spatial audio signals (and the view directions or other reproduction related control or tracking information) as shown in FIG. 12*b* by step 1261.

The next operation is one of time-frequency converting the audio signals as shown in FIG. 12*b* by step 1263.

The next operation is applying a parametric binaural (or loudspeaker channel format) processor based on the time-frequency converted audio signals, the metadata and viewing direction (or other information) as shown in FIG. 12*b* by step 1265.

Then the next operation is inverse transforming the generated binaural or loudspeaker channel audio signals as shown in FIG. 12*b* by step 1267.

Then the output audio format is then output as shown in FIG. 12*b* by step 1269.

Considering a loudspeaker output for the reproduction processor when the audio signal is in a form of multichannel audio and focus processor 950 in FIG. 9*a* is applied, then in some embodiments the reproduction processor may comprise a pass-through where the output loudspeaker configuration is the same as the format of the input signal. In some embodiments where the output loudspeaker configuration differs from the input loudspeaker configuration, reproduction processor may comprise a vector-base amplitude panning (VBAP) processor. Each of the focus-processed audio channels can then be processed using VBAP, a known amplitude panning technique, to spatially reproduce them using the target loudspeaker configuration. The output audio signal is thus matched to the output loudspeaker setup.

In some embodiments the conversion from the first loudspeaker configuration to the second loudspeaker configuration may be implemented using any suitable amplitude panning technique. For example an amplitude panning technique may comprise deriving a N-by-M matrix of amplitude panning gains that define conversion from a M channels of the first loudspeaker configuration to a N channels of the second loudspeaker configuration and then use the matrix to multiply the channels of an intermediate spatial audio signal provided as a multi-channel loudspeaker signal according to the first loudspeaker configuration. The intermediate spatial audio signal may be understood to be similar to the audio signal with a focused sound component 204 as shown in FIG. 2*a*. As a non-limiting example, derivation of VBAP amplitude panning gains is provided in Pulkki, Ville: "*Virtual sound source positioning using vector base amplitude panning*", Journal of the audio engineering society 45, no. 6 (1997), pp. 456-466.

For binaural output any suitable binauralization of a multi-channel loudspeaker signal format (and/or objects) may be implemented. For example a typical binauralization may comprise processing the audio channels with head-related transfer functions (HRTFs) and adding synthetic room reverberation to generate an auditory impression of a listening room. The distance+directional (i.e., positional) information of the audio object sounds can be utilized for the 6DOF reproduction with user movement, by adopting the principles outlined for example in GB patent application GB1710085.0.

Figure 13:
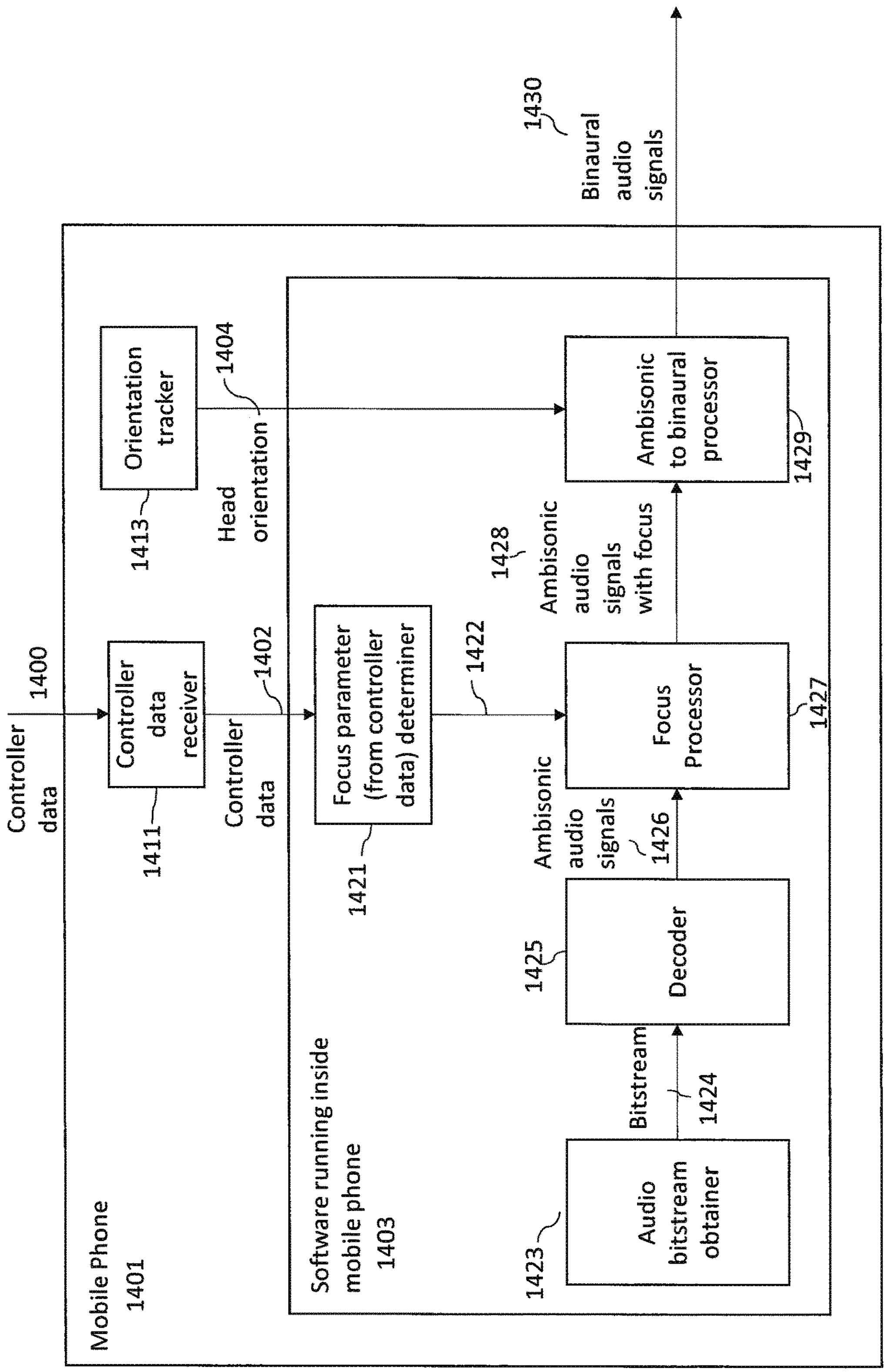
FIG. 13 shows an example implementation of some embodiments.

An example apparatus suitable for implementation is shown in FIG. 13 in the form of a mobile phone or mobile device 1401 running suitable software 1403. The video could be reproduced, for example, by attaching the mobile phone 1401 to a Daydream view type device (although for clarity video processing is not discussed here).

An audio bitstream obtainer 1423 is configured to obtain an audio bitstream 1424, for example being received/retrieved from storage. In some embodiments the mobile device comprises a decoder 1425 configured to receive compressed audio and decode it. Examples of the decoder is an AAC decoder in the case of AAC decoding. The resulting decoded (for example Ambisonic where the example implements the examples as shown in FIGS. 5*a* and 11*a*) audio signals 1426 can be forwarded to the focus processor 1427.

The mobile phone 1401 receives controller data 1400 (for example via Bluetooth) from an external controller at a controller data receiver 1411 and passes that data to the focus parameter (from controller data) determiner 1421. The focus parameter (from controller data) determiner 1421 determines the focus parameters, for example based on the orientation of the controller device and/or button events. The focus parameters can comprise any kind of combination of the proposed focus parameters (e.g., focus direction, focus amount, focus height, and focus width). The focus parameters 1422 are forwarded to the focus processor 1427.

Based on the Ambisonic audio signals and focus parameters a focus processor 1427 is configured to create modified Ambisonic signals 1428 that have desired focus characteristics. These modified Ambisonic signals 1428 are forwarded to the Ambisonic to binaural processor 1429. The Ambisonic to binaural processor 1429 also is configured to receive head orientation information 1404 from the orientation tracker 1413 of the mobile phone 1401. Based on the modified Ambisonic signals 1428 and the head orientation information 1404, the Ambisonic to binaural processor 1429 is configured to create head-tracked binaural signals 1430 which can be outputted from the mobile phone, and played back using, e.g., headphones.

Figure 14:
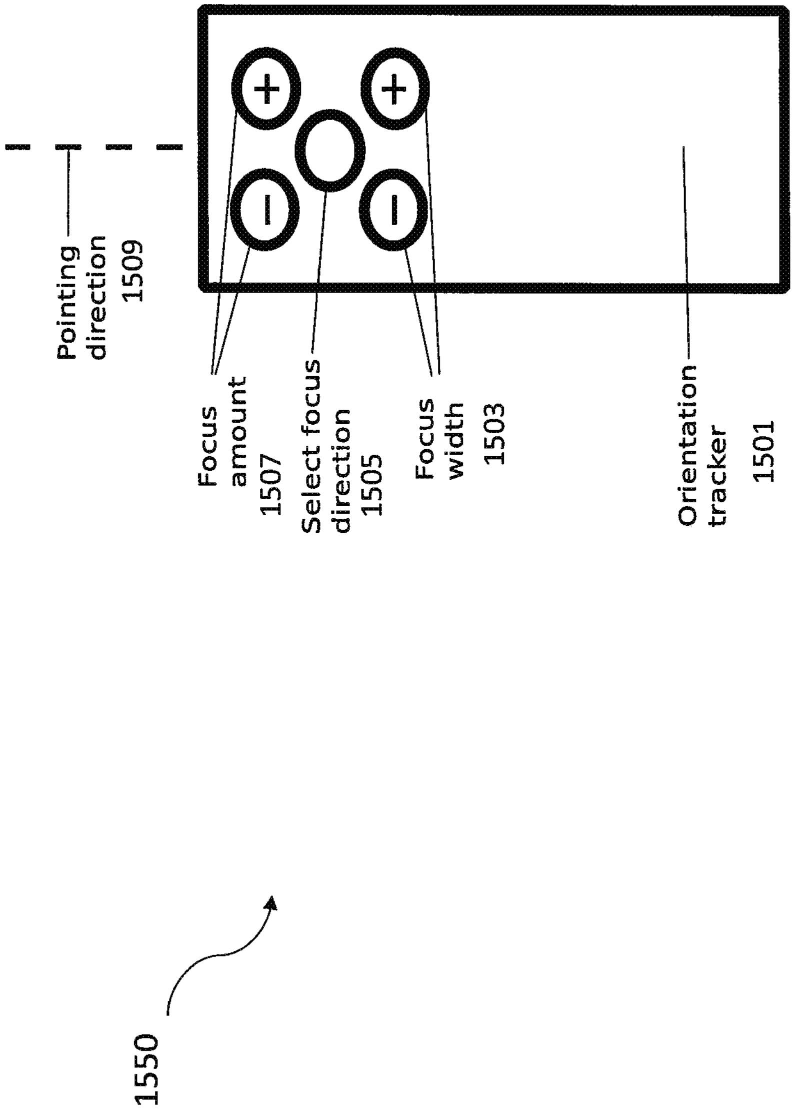
FIG. 14 shows an example controller for controlling focus direction, focus amount and focus width according to some embodiments.

FIG. 14 shows an example apparatus (or focus parameter controller) 1550 which may be configured to control or generate suitable focus parameters such as focus direction, focus amount, and focus width. A user of the apparatus can be configured to select the focus direction by pointing the controller to a desired direction 1509 and pressing a select focus direction button 1505. The controller has an orientation tracker 1501, and the orientation information may be used for determining the focus direction (e.g., in the focus parameters (from controller data) determiner 1421 as shown in FIG. 13). The focus direction in some embodiments may be visualized in a visual display while selecting the focus direction.

In some embodiments the focus amount can be controlled using Focus amount buttons (shown in FIG. 14 as + and −) 1507. Each press increases/decreases the focus amount by an amount, for example 10 percentage points. The focus width can be controlled using Focus width buttons (shown in FIG. 14 as + and −) 1503. Each press may be configured to increase/decrease the focus width by a fixed amount, such as 10 degrees.

In some embodiments the focus shape can be determined by drawing the desired shape with a controller (e.g., with the one depicted in FIG. 14). The user can start the drawing operation by pressing and holding the Select focus direction button, and then drawing a desired shape with the controller, and finally approving the shape by stopping the pressing. The drawn shape may be visualized in a visual display while drawing the shape. The drawn shape may be converted to focus direction, focus height, and focus width parameters. The focus amount may be selected with the "Focus amount" buttons, as in the previous example.

In some embodiments, the focus controller as shown in FIG. 14 is modified such that the "focus width" controls are replaced by "focus radius" controls to enable a control of complex, content-adaptive focus shapes. In such embodiments it may be implemented as part of an advanced virtual reality reproduction system, where the 360 video is not only panoramic, but contains depth information (i.e., it is substantially a 3D video that could react to user movement in 6-degrees-of-freedom). For example, the video content could have been generated by computer graphics, or by a VR video capture system that is able to detect visual depth and therefore enables 6DOF similarly to the computer-generated content.

In an example scene, there are two sources of interest, for example talkers. The user then points and clicks "select focus direction" to both of these sources, and the visual display then indicates for the user that these sources (which are not only auditory sources but also visual sources at certain directions and distances) have been selected for audio focus. Then the user selects the focus amount and focus radius parameters, where the focus radius indicates how far auditory events from the sources of interest are to be included within the determined focus shape. During control adjustment, the focus radius could be indicated as visual spheres around the visual sources of interest.

The visual field may react to user movement, but also the sources may move within the scene, and the source positions are tracked, typically visually. Therefore, the focus shape, which in this case may be represented by two spheres in the 3D space, then change its overall shape adaptively by moving those spheres.

In other words, a complex focus shape with also depth focus is obtained. Then, depending on the spatial audio format that focus shape can be either accurately reproduced (in a condition where the spatial audio has reliable distance information), or approximated otherwise, for example as was exemplified in above.

In some embodiments, it may be desirable to further specify the focus processing, for example by determining a desired frequency range or spectral property of the focused signal. In particular, it may be useful to emphasize the focused audio spectrum at the speech frequency range to improve the intelligibility, for example by attenuating low frequency content (for example, below 200 Hz), and the high-frequency content (for example, above 8 kHz), thus leaving a particularly useful frequency range related to speech.

It is understood that the focus-processed signal may be further processed with any known audio processing techniques, such as automatic gain control or enhancement techniques (e.g. bandwidth extension, noise suppression).

In some further embodiments, the focus parameters (including the direction, the amount and at least one focus shape parameter) are generated by a content creator, and the parameters are sent alongside the spatial audio signal. For example the scene may be a VR video/audio recording of an unplugged music concert near the stage. The content creator may assume that the typical remote listener wishes to determine a focus arc that spans towards the stage, and also to the sides for room acoustic effect, but removes the direct sounds from the audience (behind the VR camera main direction) at least to some degree. Therefore, a focus parameter track is added to the stream, and it can be set as the default rendering mode. However, the audience sounds are nevertheless present in the stream, and some users may prefer to discard the focus processing and enable the full sound scene including the audience sounds to be reproduced.

In other words, instead of user needing to select the direction and shape of the focus, a potentially dynamic focus parameter pre-set can be selected. The pre-set may have been fine-tuned by the content creator to well follow the show, for example, such that the focusing is turned off at the end of each song, to play back the applause to the listener. The content creator can generate some expected preference profiles as the focus parameters. The approach is beneficial since only one spatial audio signal needs to be conveyed, but different preference profiles can be added. A legacy player not enabled with focus may decode the Ambisonic signal without focus procedures.

In some further embodiments, the focus shape is controlled along with a visual zoom in the video with multiple viewing directions. The visual zoom can be conceptualized as the user controlling a set of virtual binoculars in the panoramic or 360 or 3D video. In such a use case, when the visual zoom feature is enabled (for example at least 1.5× zoom is set), then the audio focus of the spatial audio signal can also be enabled. Since the user is then clearly interested in that particular direction, the focus amount can be set to a high value, for example 80%, and the focus width can be set to correspond to the arc of the visual view in the virtual binoculars. In other words, the focus width gets smaller when the visual zoom is increased. As the focus was set to 80%, the user can hear to some degree the remaining spatial sound at the appropriate directions. In that way, the user hears the occurrence of interesting new content, and knows to turn off the visual zoom and to view to the new direction of interest. The zoom processing may also be used in the context of audio codecs that allow such processing. An example of such a codec could, e.g., be MPEG-I.

A user in such embodiments as described above may control the focus shape in a versatile way using the present invention.

Figure 15:
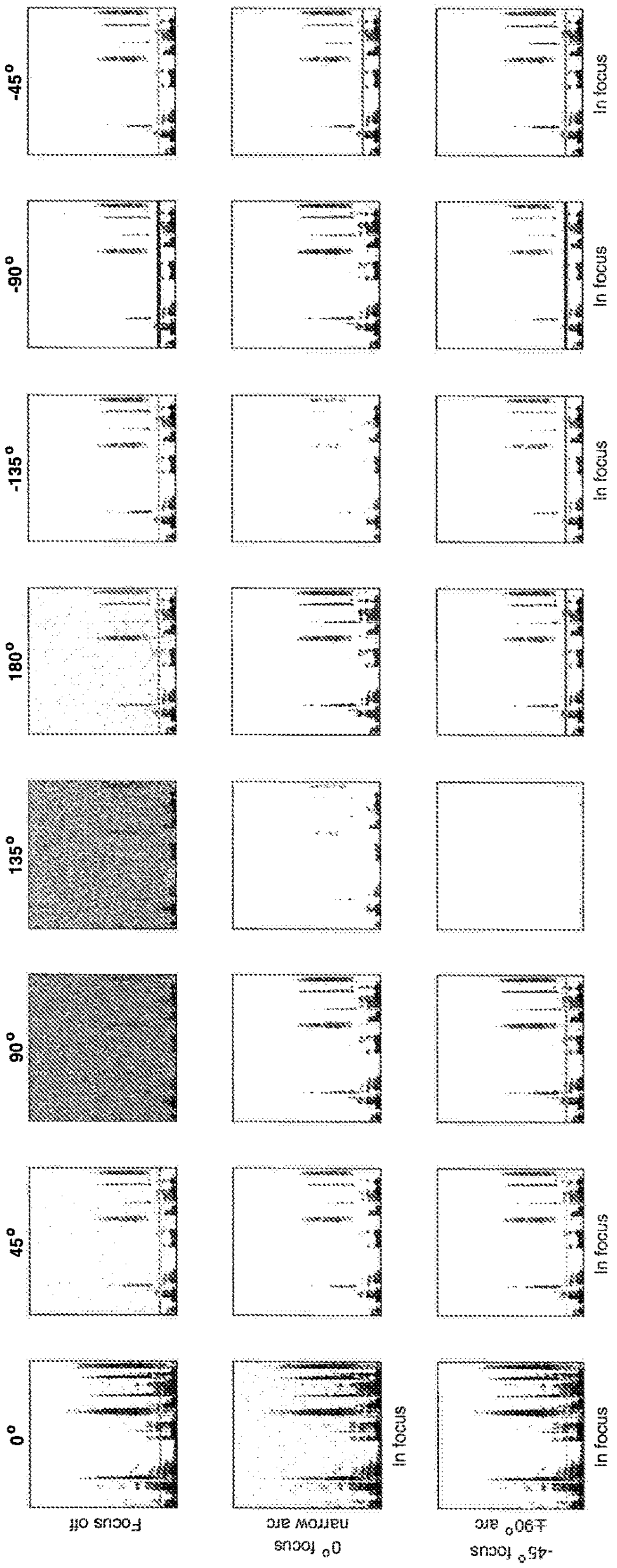
FIG. 15 shows an example processing output based on processing the higher order Ambisonics audio signals according to some embodiments.

An example processing output based on the implementation described for higher-order Ambisonics (HOA) signals is shown in FIG. 15. The figure shows 8-channel loudspeaker-decoded output as spectrograms of a 3$^{rd}$ order HOA signal with a talker at 0°, a sinusoid at −90°, and white noise at 110°. It is illustrated how a narrow focus towards the talker reduces the relative energy of the sinusoid and the white noise, and how a wider focus, that encompasses both the talker and the sinusoid, reduces significantly only the relative energy of the white noise.

Figure 16:
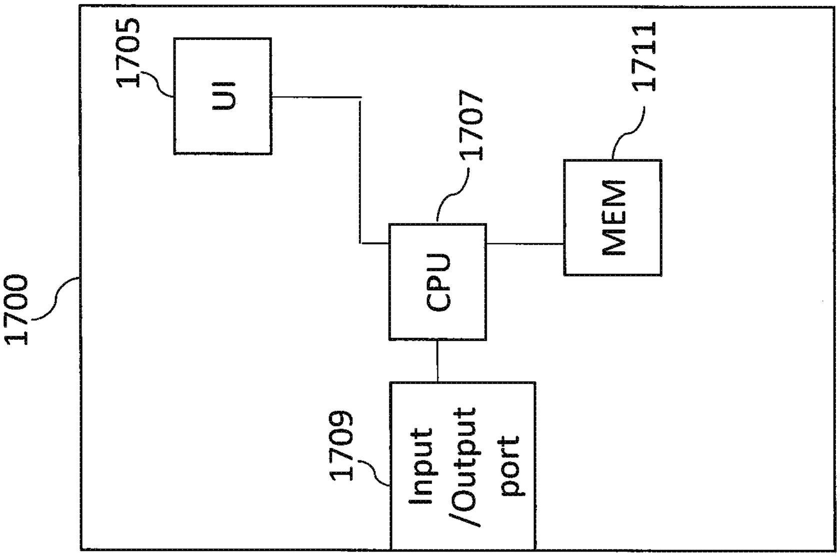
FIG. 16 shows an example device suitable for implementing the apparatus shown.

With respect to FIG. 16 an example electronic device which may be used as the analysis or synthesis device is shown. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals and in some embodiments obtain the focus parameters as described herein.

In some embodiments the device 1700 may be employed to generate a suitable audio signal using the processor 1707 executing suitable code. The input/output port 1709 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus to:

obtain a spatial audio signal for playback audio reproduction, where the spatial audio signal comprises ambient sound and at least one directional information;

obtain at least one focus parameter, where the at least one focus parameter is configured to define a focus shape based, at least partially, on the spatial audio signal;

process the spatial audio signal, where the spatial audio signal represents an audio scene, and where the processing of the spatial audio signal comprises use of the at least one focus parameter to generate a processed spatial audio signal that represents a modified audio scene, so as to control relative emphasis in, at least in part, a portion of the spatial audio signal in the focus shape relative to, at least in part, other portions of the spatial audio signal outside the focus shape; and output the processed spatial audio signal, where the processed spatial audio signal comprises at least one of: the at least one directional information or the ambient sound, wherein the modified audio scene enables the relative emphasis in, at least in part, the portion of the spatial audio signal in the focus shape relative to, at least in part, the other portions of the spatial audio signals outside the focus shape, wherein the at least one focus parameter is further configured to define a focus amount, and where the at least one memory stores instructions that, when executed with the at least one processor, cause the apparatus to process the spatial audio signal so as to control the relative emphasis in, at least in part, the portion of the spatial audio signal in the focus shape according to an obtained indication of the focus amount.

2. The apparatus according to claim 1, wherein the processed spatial audio signal is configured to cause the apparatus to:

increase the relative emphasis in, at least in part, the portion of the spatial audio signal in the focus shape relative to at least in part other portions of the spatial audio signals outside the focus shape; or decrease the relative emphasis in, at least in part, the portion of the spatial audio signal in the focus shape relative to at least in part other portions of the spatial audio signal outside the focus shape.

3. The apparatus according to claim 1, wherein the processed spatial audio signal is configured to cause the apparatus to increase or decrease a relative sound level in, at least in part, the portion of the spatial audio signal in the focus shape relative to at least in part other portions of the spatial audio signal outside the focus shape.

4. The apparatus according to claim 3, wherein the processed spatial audio signal is configured to cause the apparatus to increase or decrease the relative sound level according to the focus amount.

5. The apparatus according to claim 1, wherein the at least one memory stores instructions that, when executed with the at least one processor, cause the apparatus to:

obtain reproduction control information to control at least one aspect of outputting the processed spatial audio signal, and wherein the apparatus is caused to output the processed spatial audio signal which further causes the apparatus to one of:

process the processed spatial audio signal that represents the modified audio scene to generate an output spatial audio signal in accordance with the reproduction control information; or process the spatial audio signal in accordance with the reproduction control information before processing the spatial audio signal that represents the modified audio scene and output the processed spatial audio signal as the output spatial audio signal.

6. The apparatus according to claim 1, wherein the spatial audio signal and the processed spatial audio signal comprise respective Ambisonic signals, and wherein the processed spatial audio signal is configured to cause the apparatus, for one or more frequency sub-bands, to:

convert the Ambisonic signals associated with the spatial audio signal to a set of beam signals in a defined pattern; or generate, a set of modified beam signals based on the set of beam signals, the focus shape and the focus amount; or convert the modified beam signals to generate the modified Ambisonic signals associated with the processed spatial audio signal.

7. The apparatus according to claim 6, wherein the defined pattern comprises a defined number of beams which are spaced over a plane or over a volume.

8. The apparatus according to claim 6, wherein the spatial audio signal and the processed spatial audio signal comprise at least one of:

respective higher order Ambisonic signals; or a subset of Ambisonic signal components of an order.

9. The apparatus according to claim 1, wherein the spatial audio signal and the processed spatial audio signal comprise respective parametric spatial audio signals, wherein a parametric spatial audio signal comprises one or more audio channels and spatial metadata, wherein the spatial metadata comprises a respective direction indication, an energy ratio parameter, and a distance indication for a plurality of frequency sub bands, wherein the processed spatial audio signal is configured to cause the apparatus to at least one of:

compute, for one or more frequency sub-bands, spectral adjustment factors based on the spatial metadata, the focus shape and focus amount;

apply the spectral adjustment factors for the one or more frequency sub-bands of the one or more audio channels to generate one or more processed audio channels;

compute respective modified energy ratio parameters associated with the one or more frequency sub-bands of the processed spatial audio signal based on the focus shape, the focus amount and at least a part of the spatial metadata; or compose the processed spatial audio signal comprising the one or more processed audio channels, the modified energy ratio parameters, and the spatial metadata other than the energy ratio parameters.

10. The apparatus according to claim 9, wherein the multi-channel loudspeaker channels and/or audio object channels further comprises respective audio channel distance indication, and wherein the computed gain adjustment factors are further based on the audio channel distance indication.

11. The apparatus according to claim 9, wherein the at least one memory stores instructions that, when executed with the at least one processor, cause the apparatus to determine a default respective audio channel distance, and wherein the computed gain adjustment factors are further based on the audio channel distance.

12. The apparatus according to claim 1, wherein the spatial audio signal and the processed spatial audio signal comprise multi-channel loudspeaker channels and/or audio object channels, wherein the processed spatial audio signal is configured to cause the apparatus to:

compute gain adjustment factors based on the respective audio channel direction indication, the focus shape and focus amount; or apply the gain adjustment factors to the respective audio channels; or compose the processed spatial audio signal comprising the one or more processed multichannel loudspeaker audio channels and/or the one or more processed audio object channels.

13. The apparatus according to claim 1, wherein the at least one focus parameter configured to define a focus shape comprises at least one of:

a focus direction;
a focus width;
a focus height;
a focus radius;
a focus distance;
a focus depth;
a focus range;
a focus diameter; or
a focus shape characterizer.

14. The apparatus according to claim 1, wherein the at least one memory stores instructions that, when executed with the at least one processor, cause the apparatus to obtain a focus input from a sensor arrangement that comprises at least one direction sensor and at least one user input, wherein the focus input comprises:

an indication of a focus direction for the focus shape based on the at least one direction sensor direction; and an indication of a focus width based on the at least one user input.

15. The apparatus according to claim 1, wherein the at least one memory stores instructions that, when executed with the at least one processor, cause the apparatus to obtain a focus input comprising at least one user input, and wherein the focus input further comprises an indication of the focus amount based on the at least one user input.

16. The method according to claim 15, wherein processing the spatial audio signal comprises:

increasing the relative emphasis in, at least in part, the portion of the spatial audio signal in the focus shape relative to at least in part other portions of the spatial audio signals outside the focus shape; or decreasing the relative emphasis in, at least in part, the portion of the spatial audio signal in the focus shape relative to at least in part other portions of the spatial audio signal outside the focus shape.

17. The apparatus according to claim 1, where the instructions, when executed with the at least one processor, cause the apparatus to:

receive the spatial audio signal, and where the focus shape is defined, with use of the at least one focus parameter, after the spatial audio signal is received.

18. The apparatus according to claim 17, where the instructions, when executed with the at least one processor, cause the apparatus to receive the spatial audio signal in or along a bitstream, where the at least one focus parameter is configured to define the focus shape based, at least partially, on the spatial audio signal in or along the bitstream.

19. A method comprising:

obtaining a spatial audio signal for playback audio reproduction, where the spatial audio signal comprises ambient sound and at least one directional information;

obtaining at least one focus parameter, where the at least one focus parameter is configured to define a focus shape based, at least partially, on the spatial audio signal;

processing the spatial audio signal, where the spatial audio signal represents an audio scene, and where the processing of the spatial audio signal generates a processed spatial audio signal that represents a modified audio scene, so as to control relative emphasis in, at least in part, a portion of the spatial audio signal in the focus shape relative to, at least in part, other portions of the spatial audio signal outside the focus shape; and outputting the processed spatial audio signal, where the processed spatial audio signal comprises at least one of: the at least one directional information or the ambient sound, wherein the modified audio scene enables the relative emphasis in, at least in part, the portion of the spatial audio signal in the focus shape relative to, at least in part, the other portions of the spatial audio signal outside the focus shape, wherein the at least one focus parameter is configured to define a focus amount, and wherein the processing of the spatial audio signal comprises controlling the relative emphasis in, at least in part, the portion of the spatial audio signal in the focus shape according to an obtained indication of the focus amount.

20. The method according to claim 19, wherein processing the spatial audio signal comprises at least one of:

increasing or decreasing a relative sound level in, at least in part, the portion of the spatial audio signal in the focus shape relative to at least in part other portions of the spatial audio signal outside the focus shape; or increasing or decreasing the relative sound level according to the focus amount.

21. A non-transitory program storage device readable by an apparatus, tangibly embodying a program of instructions executable with the apparatus for performing operations, the operations comprising:

obtaining a spatial audio signal for playback audio reproduction, where the spatial audio signal comprises ambient sound and at least one directional information;

obtaining at least one focus parameter, where the at least one focus parameter is configured to define a focus shape based, at least partially, on the spatial audio signal;

processing the spatial audio signal, where the spatial audio signal represents an audio scene, and where the processing of the spatial audio signal generates a processed spatial audio signal that represents a modified audio scene, so as to control relative emphasis in, at least in part, a portion of the spatial audio signal in the focus shape relative to, at least in part, other portions of the spatial audio signal outside the focus shape; and outputting the processed spatial audio signal, where the processed spatial audio signal comprises at least one of: the at least one directional information or the ambient sound, wherein the modified audio scene enables the relative emphasis in, at least in part, the portion of the spatial audio signal in the focus shape relative to, at least in part, the other portions of the spatial audio signal outside the focus shape, wherein the at least one focus parameter defines a focus amount, and wherein the processing of the spatial audio signal comprises controlling the relative emphasis in, at least in part, the portion of the spatial audio signal in the focus shape according to an obtained indication of the focus amount.

* * * * *